United States Patent
Torigaki et al.

(10) Patent No.: US 12,005,964 B2
(45) Date of Patent: Jun. 11, 2024

(54) COMPOSITE STRUCTURE AND MANUFACTURING METHOD THEREFOR

(71) Applicant: NISSAN MOTOR CO., LTD., Yokohama (JP)

(72) Inventors: Toshikazu Torigaki, Kanagawa (JP); Shinichiro Takemoto, Kanagawa (JP); Naoya Matsuoka, Kanagawa (JP); Zhe Jiang, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 384 days.

(21) Appl. No.: 17/437,605

(22) PCT Filed: Mar. 12, 2019

(86) PCT No.: PCT/IB2019/000221
§ 371 (c)(1),
(2) Date: Sep. 9, 2021

(87) PCT Pub. No.: WO2020/183208
PCT Pub. Date: Sep. 17, 2020

(65) Prior Publication Data
US 2022/0185392 A1 Jun. 16, 2022

(51) Int. Cl.
*B62D 27/02* (2006.01)
*B29C 45/14* (2006.01)
(Continued)

(52) U.S. Cl.
CPC ...... *B62D 27/023* (2013.01); *B29C 45/14467* (2013.01); *B62D 29/004* (2013.01); *B62D 29/041* (2013.01); *B29K 2705/02* (2013.01)

(58) Field of Classification Search
CPC ...... B62D 21/00; B62D 21/02; B62D 23/005; B62D 25/025; B62D 25/20; B62D 25/2036; B62D 27/023; B62D 29/001
(Continued)

(56) References Cited

U.S. PATENT DOCUMENTS

| | | | |
|---|---|---|---|
| 6,364,789 B1 | 4/2002 | Kosmatka | |
| 8,424,912 B2 * | 4/2013 | Favaretto | B62D 23/005 |
| | | | 296/205 |

(Continued)

FOREIGN PATENT DOCUMENTS

| | | | | |
|---|---|---|---|---|
| CA | 2394790 A1 | 5/2001 | | |
| DE | 19538803 A1 * | 4/1996 | ........... | B62D 23/005 |

(Continued)

OTHER PUBLICATIONS

International Preliminary Report on Patentability and English translation, International Application No. PCT/IB2019/000221, dated Sep. 16, 2021, 17 pages.

*Primary Examiner* — Jason S Daniels
(74) *Attorney, Agent, or Firm* — Foley & Lardner LLP

(57) ABSTRACT

A composite structural body (A) includes a first metal member (M1) having a plate-like shape, a second metal member (M2) having a plate-like shape, and a resin member (R) that integrates the first metal member (M1) and the second metal member (M2) with each other. The resin member (R) includes a first resin layer (R1) that coats astride one main surface of the first metal member (M1) and one main surface of the second metal member (M2), and a second resin layer (R2) that coats astride another main surface of the first metal member (M1) and another main surface of the second metal member (M2). The composite structural body (A) is provided as a composite structural body that has satisfactory moldability, that is capable of (Continued)

securing sufficient strength, and that is suitable as a component of a structure such as a vehicle body.

13 Claims, 29 Drawing Sheets

(51) Int. Cl.
    *B62D 29/00*     (2006.01)
    *B62D 29/04*     (2006.01)
    *B29K 705/02*     (2006.01)

(58) Field of Classification Search
    USPC ... 296/181.1, 184.1, 187.09, 193.05, 193.07, 296/209
    See application file for complete search history.

(56) References Cited

U.S. PATENT DOCUMENTS

| | | | |
|---|---|---|---|
| 9,914,490 B2 * | 3/2018 | Schauerte | B62D 29/002 |
| 11,753,084 B2 * | 9/2023 | Oda | B62D 25/025 |
| | | | 296/193.01 |
| 2001/0028130 A1 | 10/2001 | Yagi | |
| 2007/0131012 A1 | 6/2007 | Eipper et al. | |
| 2007/0182180 A1 | 8/2007 | Eipper et al. | |
| 2011/0133517 A1 | 6/2011 | Leanza | |
| 2017/0011730 A1 | 1/2017 | Seto et al. | |
| 2017/0100767 A1 | 4/2017 | Brauch et al. | |

FOREIGN PATENT DOCUMENTS

| | | | | |
|---|---|---|---|---|
| DE | 10329017 A1 * | 1/2005 | | B62D 23/005 |
| DE | 10 2016 011 304 A1 | 3/2018 | | |
| EP | 3165428 A1 * | 5/2017 | | B62D 27/023 |
| JP | 53-128676 A | 11/1978 | | |
| JP | 1-127332 | 5/1989 | | |
| JP | 11-77736 A | 3/1999 | | |
| JP | 2003-514693 A | 4/2003 | | |
| JP | 2003-518993 A | 6/2003 | | |
| JP | 2006-266300 A | 10/2006 | | |
| JP | 2007-120096 A | 5/2007 | | |
| JP | 5523849 B2 | 6/2014 | | |
| JP | 2014-169009 A | 9/2014 | | |
| JP | 2021167174 A * | 10/2021 | | |
| WO | WO 2015/115647 A1 | 8/2015 | | |

* cited by examiner

COMPOSITE STRUCTURE AND MANUFACTURING METHOD THEREFOR

TECHNICAL FIELD

The present invention relates to a composite structural body including metal members each having a plate-like shape, and a resin member that integrates the metal members with each other. For example, the present invention relates to a composite structural body suitable for use in a structure such as a vehicle body, and to a manufacturing method therefor.

BACKGROUND ART

Hitherto, composite structural bodies such as that disclosed under the title "FRAME SIDE MEMBER OF VEHICLE BODY STRUCTURE" in Patent Literature 1 have been provided. The composite structural body disclosed in Patent Literature 1 includes a resin reinforcing structure in a space formed between a metal outer frame and a metal inner frame.

The composite structural body constitutes an automotive side panel. The metal outer frame, which is manufactured as a single piece, has a recessed cross-sectional shape opened on one side. Meanwhile, the metal inner frame, which is preferably manufactured as a single component, has a cross-sectional shape that closes an opening part of the outer frame. In addition, the composite structural body has a structure formed by molding a resin reinforcing structure inside the outer frame, and then by linking the inner frame to the opening part of the outer frame.

CITATION LIST

Patent Document

Patent Document 1: Japanese Patent No. 5523849

SUMMARY OF INVENTION

Technical Problem

However, in order to manufacture the single-piece outer frame having the recessed cross-sectional shape of the conventional composite structural body as described above, deep drawing of a metal plate needs to be performed. In this case, the outer frame needs to be made of a material having low strength and being stretchable, and hence may be difficult to apply to structures that need predetermined strength, such as a vehicle body panel. Meanwhile, in order to secure strength of the composite structural body, it is conceivable to additionally interpose members other than the resin member that constitutes the composite structural body at coupling parts or branch parts of the metal members. In this case, there are problems that the number of man-hours and manufacturing cost increase.

The present invention has been made in view of the circumstances in the related art as described above, and an object thereof is to provide a composite structural body that has satisfactory moldability, that is capable of securing sufficient strength, and that is suitable as a component of a structure such as a vehicle body.

Solution to Problem

According to the present invention, there is provided a composite structural body including:
- a first metal member having a plate-like shape;
- a second metal member having a plate-like shape; and
- a resin member that integrates the first metal member and the second metal member with each other.

In addition, the resin member of the composite structural body includes
- a first resin layer that coats astride one main surface of the first metal member and one main surface of the second metal member, and
- a second resin layer that coats astride another main surface of the first metal member and another main surface of the second metal member.

According to the present invention, there is provided a manufacturing method for the composite structural body in which the resin member includes a link portion that links the first resin layer and the second resin layer to each other. This manufacturing method is implemented by using a mold assembly including a molding space conforming to the first metal member, the second metal member, and the resin member, the manufacturing method including:
- setting the first metal member and the second metal member in the molding space; forming a gap between the first metal member and the second metal member;
- charging a molten resin being a material of the resin member into the molding space from a side where the one main surface of the first metal member and the one main surface of the second metal member are arranged; and
- causing the molten resin to flow through the gap between the first metal member and the second metal member into a side where the other main surface of the first metal member and the other main surface of the second metal member are arranged. In this way, by the manufacturing method, the resin member including the first resin layer, the second resin layer, and the link portion formed in the gap is formed, and the first metal member, the second metal member, and the resin member are integrated with each other.

Advantageous Effects of Invention

The composite structural body according to the present invention includes the first metal member having the plate-like shape and the second metal member having the plate-like shape, and the resin member that integrates both the metal members with each other. This enables the first metal member and the second metal member to be formed into shapes simpler than those in a case where the first metal member and the second metal member are molded into a single piece. Thus, the first metal member and the second metal member can be easily molded into appropriate shapes by plastic working such as pressing. In addition, through the integration with the resin member including the first resin layer and the second resin layer by insert molding of the resin, strength of coupling the metal members to each other, and rigidity of a structural body can be secured.

In addition, the composite structural body is capable of forming a structure in combination with another composite structural body. In other words, the structure can be divided into a plurality of divided parts each being the composite structural body. In such a way, the composite structural body can have satisfactory moldability and secure sufficient strength so as to be suitable as a component of the structure such as a vehicle body.

By the manufacturing method for the composite structural body according to the present invention, the composite structural body, which employs the above-described configuration, can be provided to have satisfactory moldability and sufficient strength, and to be suitable as a component of the structure such as a vehicle body.

DESCRIPTION OF THE EMBODIMENTS

First Embodiment

FIG. 1 to FIG. 6 are explanatory views of a composite structural body according to a first embodiment of the present invention. Note that, for the sake of convenience, the following embodiments are described on a premise that relationships between a top, a bottom, a right, and a left of each component correspond to those in a posture in the illustration. Thus, the relationships between the top, the bottom, the right, and the left of each of the components may be different from those in a posture in practical use.

Figure 1:
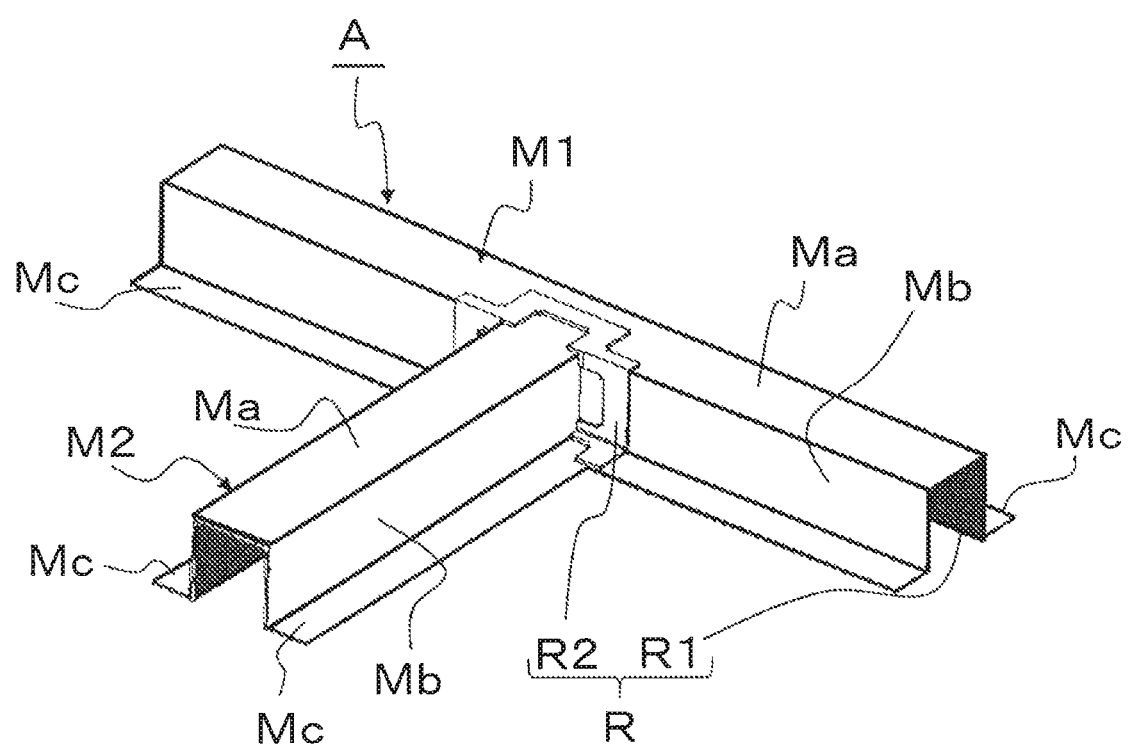
FIG. 1 is a perspective view of a composite structural body according to a first embodiment of the present invention.
Figure 2:
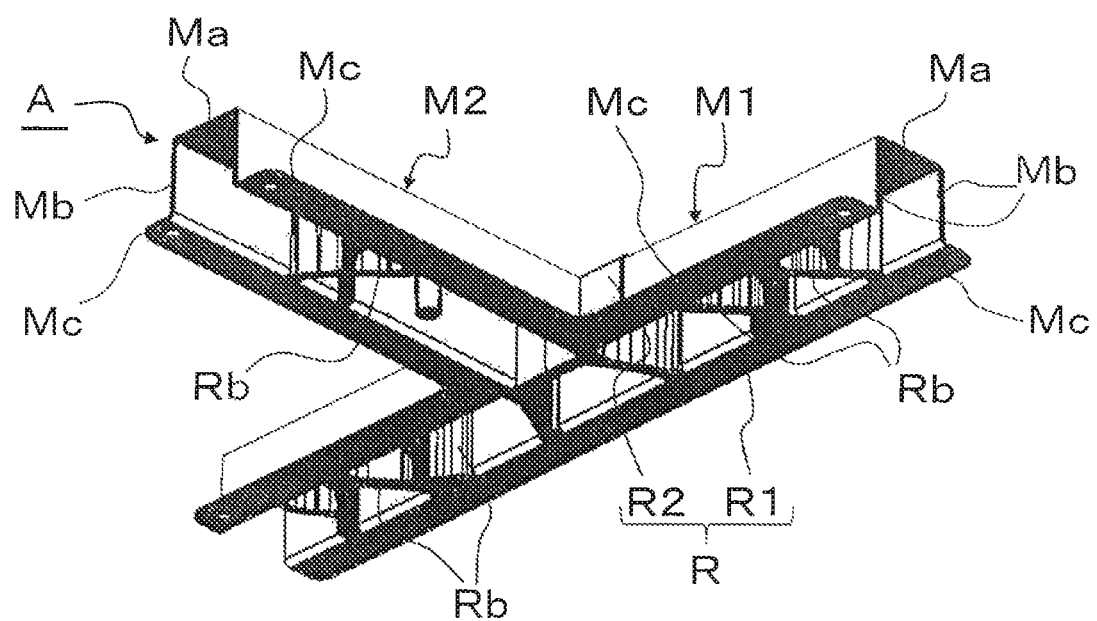
FIG. 2 is a perspective view illustrating a state in which the composite structural body illustrated in FIG. 2 is viewed from its bottom surface side.

A composite structural body A illustrated in FIG. 1 and FIG. 2 includes a first metal member M1 having a plate-like shape, a second metal member M2 having a plate-like shape, and a resin member R that integrates the first metal member M1 and the second metal member M2 with each other. The resin member R includes a first resin layer R1 that coats astride respective one main surfaces of the first metal member M1 and the second metal member M2, and a second resin layer R2 that coats astride respective other main surfaces of the first metal member M1 and the second metal member M2.

The main surfaces of each of the metal plate members M1 and M2 each having the plate-like shape are one surface and another surface in a front-and-back relationship to each other, and are not edge surfaces that appear as a plate thickness. In addition, in the composite structural body A, the first metal member M1 and the second metal member M2 are arranged such that their main surfaces are continuous with each other, and then are integrated with each other with the resin member R. At this time, the first metal member M1 and the second metal member M2 may be held in contact with each other, or may be spaced away from each other with an appropriate gap.

Although materials of the first metal member M1 and the second metal member M2 are not particularly limited, for example, aluminum alloys may be used. Note that, the first metal member M1 and the second metal member M2 each having the plate-like shape need not necessarily be members having flat-plate-like shapes, and may encompass members formed by molding raw materials having flat-plate-like shapes into appropriate three-dimensional shapes by plastic working. In addition, materials of the resin member R are not particularly limited, and, for example, a carbon-fiber-reinforced thermoplastic resin (CFRTP) using discontinuous carbon fiber as a reinforcing material may be used.

Figure 3:
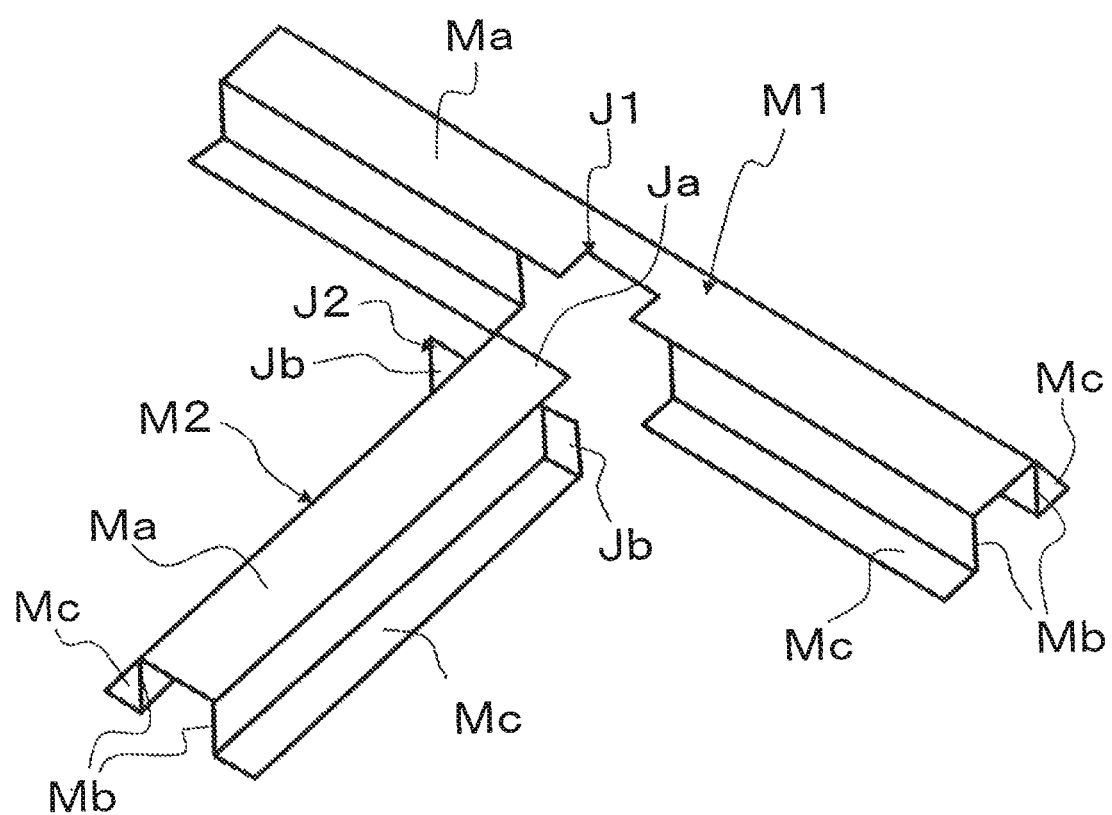
FIG. 3 is a perspective view illustrating a state in which a first metal member and a second metal member have not been coupled to each other.
Figure 4:
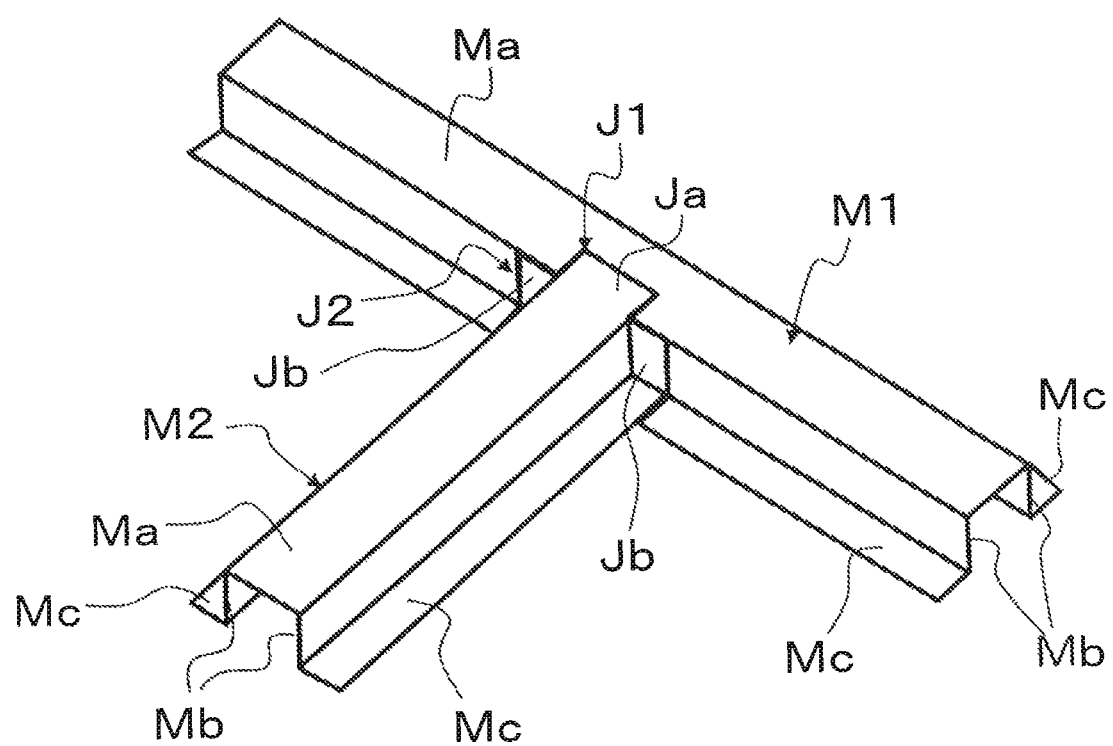
FIG. 4 is a perspective view illustrating how the first metal member and the second metal member are coupled to each other.

As illustrated in FIG. 3 and FIG. 4, the first metal member M1 and the second metal member M2 of this embodiment have equivalent hat cross-sectional shapes, that is, are each what is called a hat member. Specifically, both the metal members M1 and M2 each include a top portion Ma, a pair of lateral portions Mb and Mb, and a pair of flange portions Mc and Mc. Even when made, for example, of high-strength materials, both such metal members M1 and M2 can be easily molded by the plastic working such as bending or deep drawing of plates of such metal materials. Thus, a range of options of the materials is expanded.

Then, with the top portions Ma facing up and an end portion of the second metal member M2 being coupled to a midpoint of the lateral portion Mb of the first metal member M1, the first metal member M1 and the second metal member M2 are integrated with each other with the resin member R. In this way, the composite structural body A is formed to have a T-shape.

In addition, in the composite structural body A, an either one of the first metal member M1 and the second metal member M2 includes a recessed joint portion formed in conformity with a shape of an end portion of another one of the metal members, and an end portion of one of the metal members is engaged with the recessed joint portion of the other one of the metal members. In this embodiment, the first metal member M1 includes a recessed joint portion J1, and the second metal member M2 includes a joint portion J2 at its end portion. The joint portion J2 of the second metal member M2 is inserted in the joint portion J1 of the first metal member M1 in an engaging manner.

More specifically, the joint portion J1 of the first metal member M1 is formed into the recessed shape by partially cutting off the top portion Ma, one of the lateral portions Mb, and one of the flange portions Mc. Meanwhile, the joint portion (end portion) J2 of the second metal member M2 includes an extension piece Ja from the top portion Ma, and a pair of vertical pieces Jb and Jb perpendicular to the lateral portions Mb and the flange portions Mc. The vertical pieces Jb are formed by bending end portions of the lateral portions Mb in a lateral direction and cutting off end portions of the flange portions Mc, or by bending end portions of the flange portions Mc upward and cutting off the end portions of the lateral portions Mb. With this, an end portion of the top portion Ma is left to serve as the extension piece Ja.

Then, as illustrated in FIG. 4, in the first metal member M1 and the second metal member M2, the extension piece Ja, the vertical pieces Jb, and the flange portions Mc of the second metal member M2 are respectively arranged at the respective cut-off parts of the top portion Ma, the lateral portions Mb, and the flange portions Mc at the joint portion J1 of the first metal member M1. With this, the first metal member M1 and the second metal member M2 do not include parts to overlap with each other at their respective joint portions J1 and J2, that is, divided by a three-dimensionally continuous boundary.

The resin member R, a manufacturing method for which is described below, is molded by setting the first metal member M1 and the second metal member M2 in a mold assembly, and by charging a molten resin into the mold assembly. The first resin layer R1 of the resin member R of this embodiment coats the one main surfaces of the first metal member M1 and the second metal member M2, specifically, coats all over inner surfaces of the top portions Ma and the lateral portions Mb, and bottom surfaces of the flange portions Mc. This first resin layer R1 includes a plurality of ribs Rb arranged as in a truss structure inside the top portions Ma and the lateral portions Mb. With this, the first resin layer R1 secures mechanical strength of the first metal member M1 and the second metal member M2 and rigidity of the composite structural body A.

Figure 5:
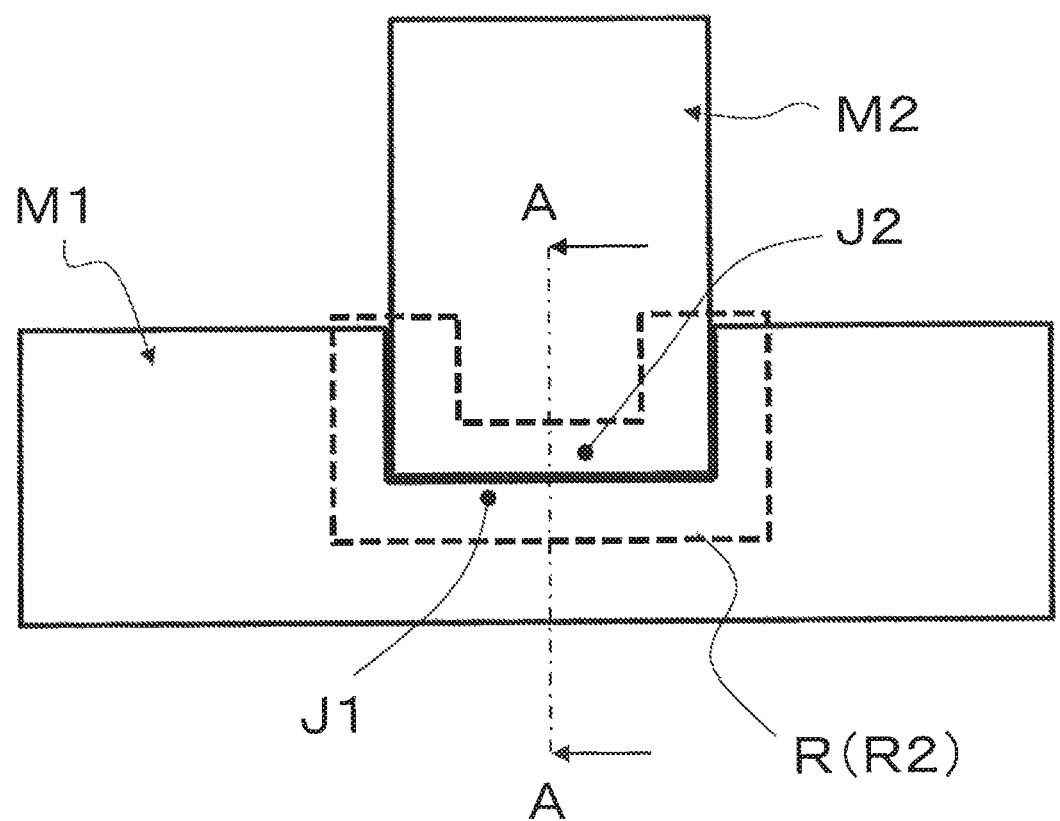
FIG. 5 is a front view of a main part of the composite structural body.
Figure 6:
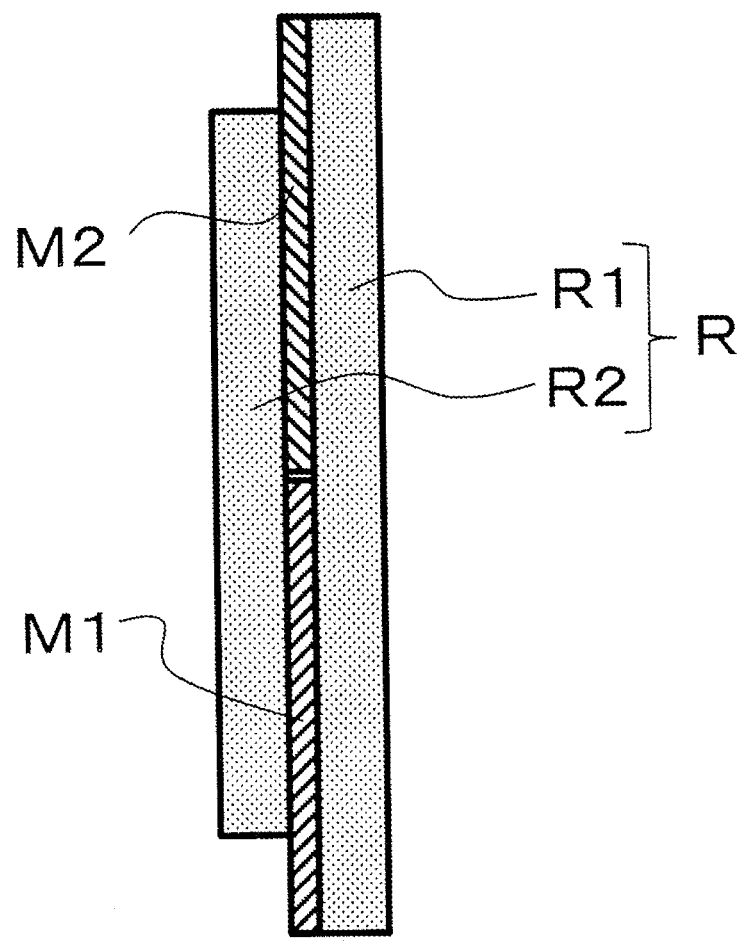
FIG. 6 is a cross-sectional view taken along the arrows A-A in FIG. 5.

In addition, the second resin layer R2 of the resin member R coats the other main surfaces of the first metal member M1 and the second metal member M2, specifically, coats outer surfaces of the top portions Ma and the lateral portions Mb, and top surfaces of the flange portions Mc. Specifically, as illustrated in FIG. 5 and FIG. 6, the second resin layer R2 is formed in a local range astride the first metal member M1 and the second metal member M2, that is, in a local range including an entirety of the boundary therebetween. At this time, a range in which the first resin layer R1 is formed astride the one main surfaces of both the metal members M1 and M2 is wider than the local range in which the second resin layer R2 is formed astride the other main surfaces of both the metal members M1 and M2. The range in which the first resin layer R1 is formed is an arbitrary range, and hence is not particularly limited. For example, the first resin layer R1 may be formed in a range out of welded spots of the metal members, or may be formed over an entire range.

The composite structural body A configured as described above, specifically, including the first metal member M1 and the second metal member M2, and the resin member R that integrates both the metal members M1 and M2 with each other enables, as in the illustration, the first metal member M1 and the second metal member M2 to be formed into shapes simpler than those in a case where the first metal member and the second metal member are molded into a single piece.

Thus, even when made of the high-strength materials, the first metal member M1 and the second metal member M2 can be easily molded into the appropriate shapes by the plastic working such as pressing. In addition, through the integration with the resin member R by insert molding of the resin, sufficient strength of coupling the metal members M1 and M2 to each other, and the rigidity of the structural body can be secured.

Further, the composite structural body A is capable of forming a structure in combination with another composite structural body. In other words, the structure can be divided into a plurality of divided parts each being the composite structural body A. In such a way, the composite structural body A can have satisfactory moldability and secure sufficient strength so as to be suitable as a component of the structure such as a vehicle body.

Still further, in the above-described composite structural body A, the recessed joint portion J1 of the either one (first metal member M1) of the first metal member M1 and the second metal member M2 is formed in conformity with the shape of the end portion of the other one of the metal members (second metal member M2). With this, in the composite structural body A, not only the above-described advantage is provided, but also both the joint portions J1 and J2 are combined with each other in a three-dimensional shape. Thus, coupling force is increased, and force to be transmitted can be propagated. As a result, the strength and the rigidity are further increased.

Yet further, in the above-described composite structural body A, the first resin layer R1 of the resin member R coats the one main surfaces of the first metal member M1 and the second metal member M2, and the second resin layer R2 is formed in the local range astride the other main surfaces of the first metal member M1 and the second metal member M2. At this time, the range in which the first resin layer R1 is formed is wider than the local range in which the second resin layer R2 is formed. With this, in the composite structural body A, even when an amount of the resin is minimized, the metal members M1 and M2 can be reliably integrated with each other, and the strength and the rigidity can be sufficiently secured.

In the above-described composite structural body A, even when external force is applied in a direction in which the first resin layer R1 and the second resin layer R2 are arrayed (right-and-left direction in FIG. 6), since the first resin layer R1 is present to coat a wide range over the first metal member M1 and the second metal member M2 with its sufficient amount of the resin, the rigidity of the structural body is increased. In accordance therewith, an amount of deformation is suppressed. Thus, the composite structural body A is prevented from breaking. The composite structural body A is prevented from breaking particularly when the first resin layer R1 that is wide on a side opposite to an input direction is arranged. This is because restorative resistance force counteracts deformation of the entirety into a bent state.

Such a composite structural body A is suitable for constituting, for example, an automotive side panel. Strength of the side panel is set in consideration of side collision. Thus, the first resin layer R1 is arranged inside such that the above-described advantage of the resistance against the deformation by the external force can be obtained. This advantage to be provided by the composite structural body A can be further enhanced if arrangements of the first resin layer R1 and the second resin layer R2 are selected in consideration of the possible external force on the structure in constituting various structures such as the side panel.

Now, a second embodiment and subsequent embodiments are described with reference to the drawings. Note that, in each of the following embodiments, the same components as those of the first embodiment are denoted by the same reference symbols to omit redundant description.

Second Embodiment

Figure 7:
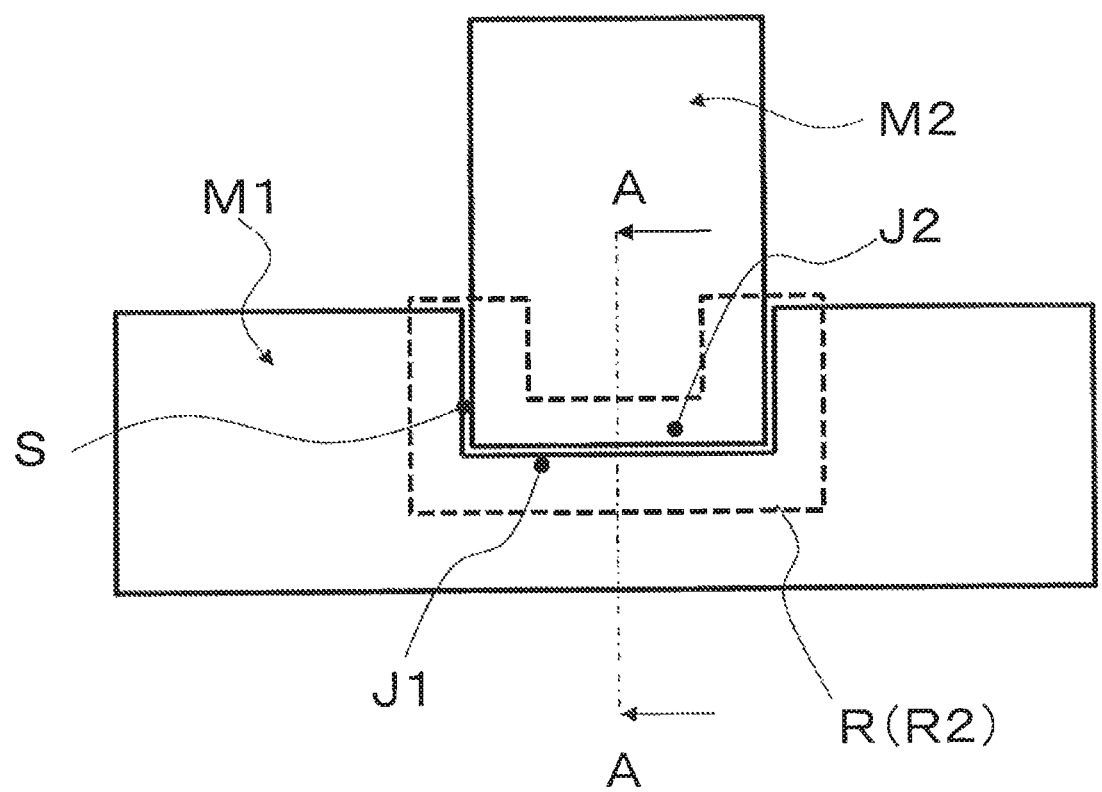
FIG. 7 is a front view of a main part of a composite structural body according to a second embodiment of the present invention.
Figure 8:
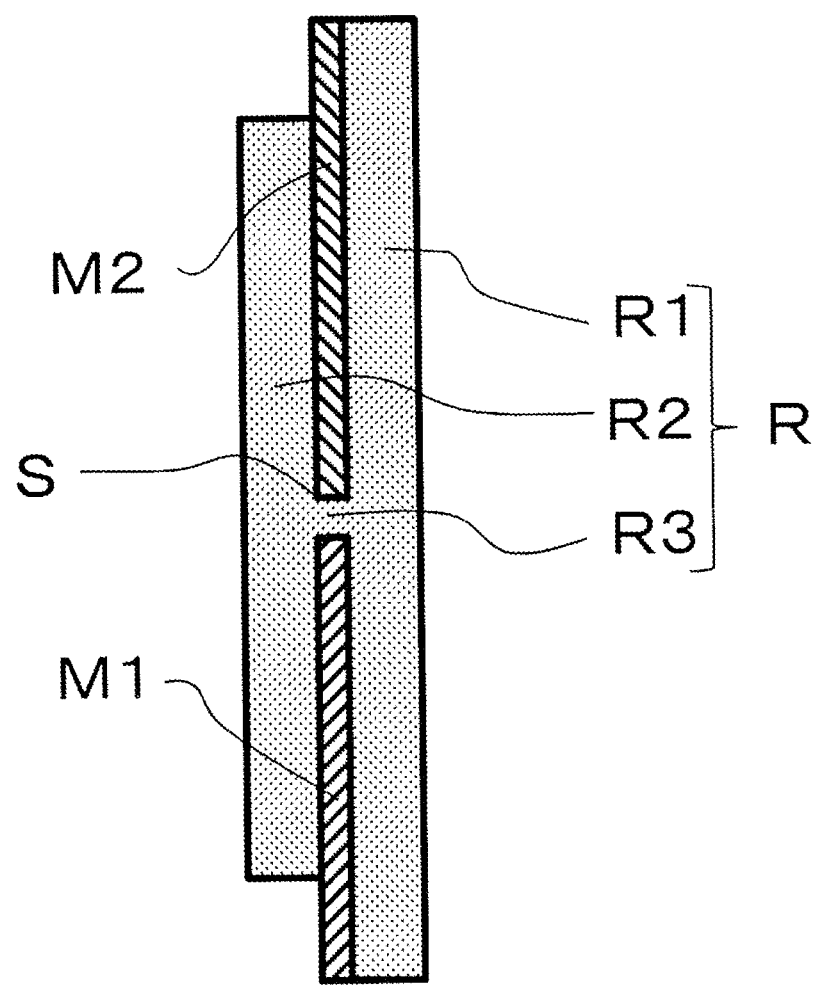
FIG. 8 is a cross-sectional view taken along the arrows A-A in FIG. 7.

The composite structural body A illustrated in FIG. 7 and FIG. 8 includes the first metal member M1 having the plate-like shape, the second metal member M2 having the plate-like shape, and the resin member R that integrates the first metal member M1 and the second metal member M2 with each other. In addition, in this composite structural body A, the resin member R includes a link portion R3 that links the first resin layer R1 and the second resin layer R2 to each other. In the composite structural body A of this embodiment, a gap S is formed between the first metal member M1 and the second metal member M2, and the link portion R3 is formed in this gap S.

In the composite structural body A configured as described above, the first resin layer R1 and the second resin layer R2 are integrated with each other with the link portion R3 in the resin member R to be obtained, and a large area in which the first metal member M1, the second metal member M2, and the resin member R are held in contact with each other can be secured. With this, the strength and rigidity of the coupling portions of both the metal members M1 and M2 can be further increased.

In addition, in the above-described composite structural body A, in molding the resin member R with use of the mold assembly, molding spaces for the first resin layer R1 and the second resin layer R2 communicate with each other via the gap S. With this, an entirety of the resin member R of the composite structural body A can be molded by charging the molten resin from one side of both the metal members M1 and M2, which can contribute to simplification of the mold assembly.

Figure 9:
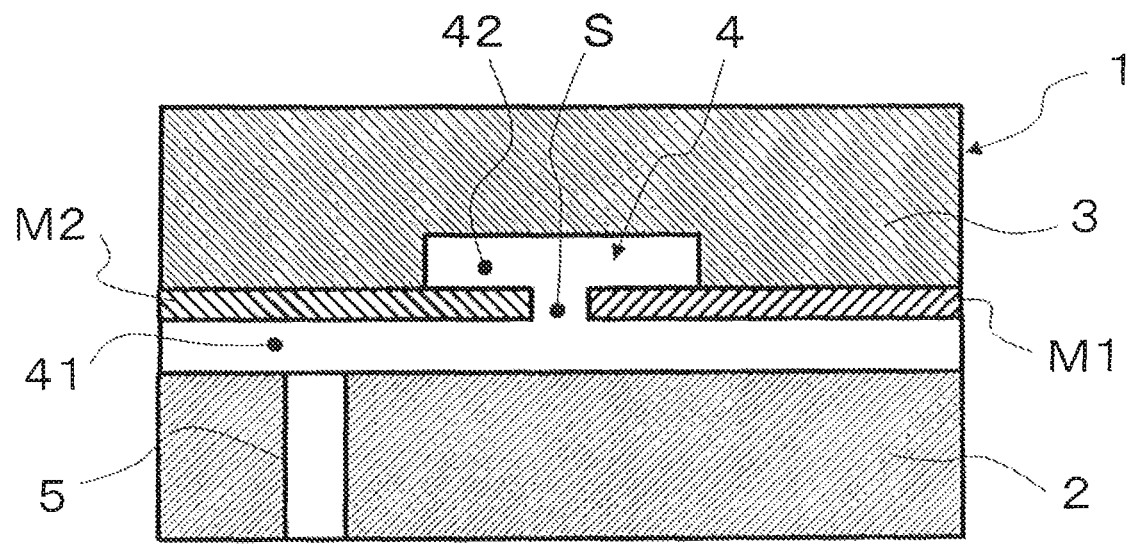
FIG. 9 is, of views illustrating a manufacturing procedure for the composite structural body illustrated in FIG. 7 and FIG. 8, a cross-sectional view illustrating a state in which the first metal member and the second metal member are set in a mold assembly.
Figure 10:
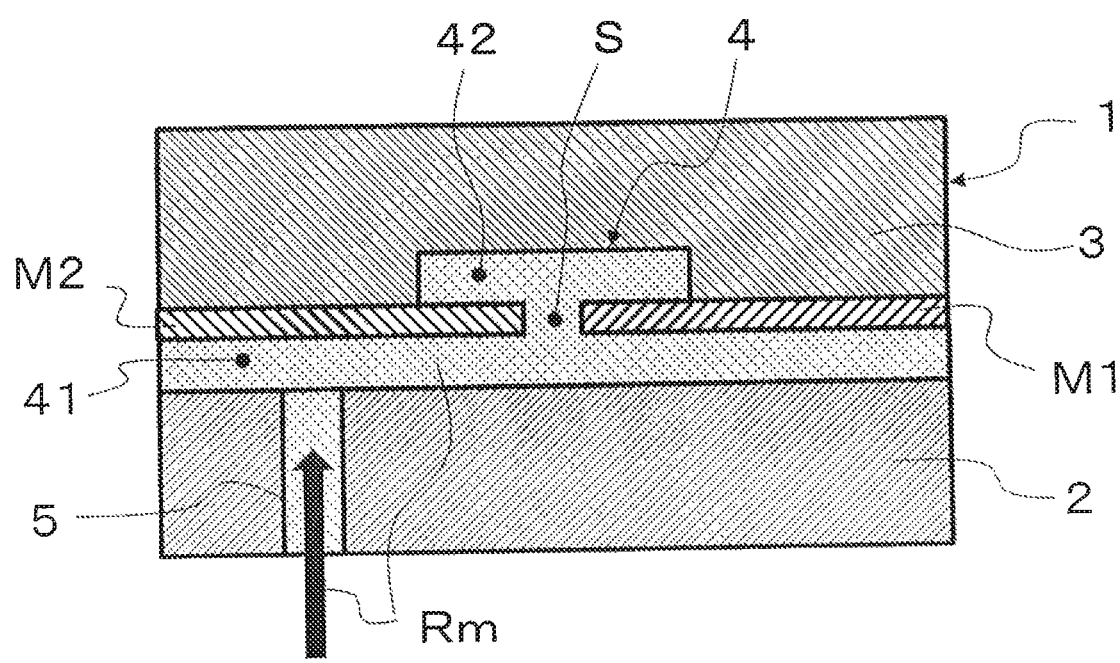
FIG. 10 is a cross-sectional view subsequent to FIG. 9, which illustrates a state in which a molten resin is supplied in the mold assembly.
Figure 11:
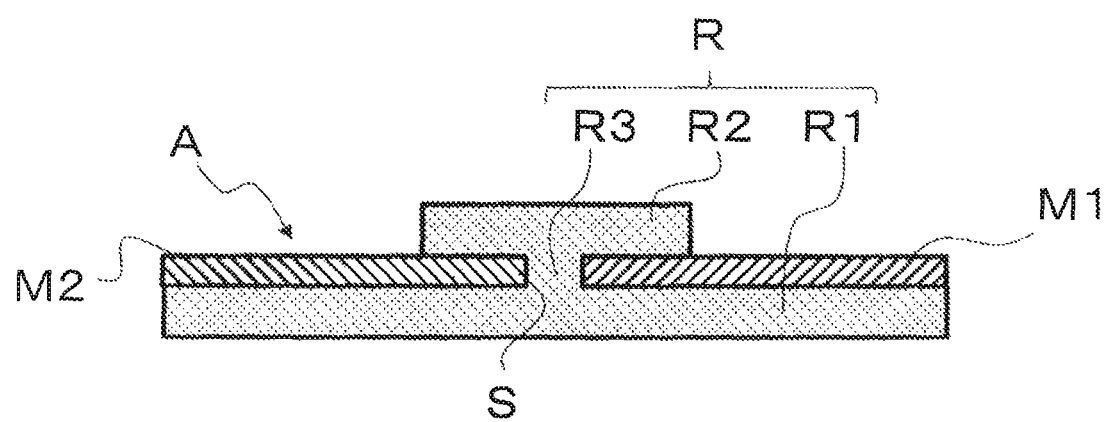
FIG. 11 is a cross-sectional view subsequent to FIG. 10, which illustrates a main part of the composite structural body after manufacture.

FIG. 9 to FIG. 11 are explanatory views illustrating a procedure of the manufacturing method for the composite structural body A described in the second embodiment. In a mold assembly 1 illustrated in FIG. 9, a molding space 4 conforming to the composite structural body A is formed between a lower fixed mold 2 and an upper movable mold 3 that can be raised and lowered. An injection port 5 that communicates with an injector (not shown) is formed through the fixed mold 2.

The manufacturing method for the composite structural body is implemented by using the mold assembly 1, and includes setting the first metal member M1 and the second metal member M2 in the molding space 4, and forming the gap S therebetween. At this time, on a side where the fixed mold 2 is arranged, a molding space 41 for the first resin layer R1 is formed in conformity with the one main surfaces of the first metal member M1 and the second metal member M2. Meanwhile, on a side where the movable mold 3 is arranged, a molding space 42 for the second resin layer R2 is formed in conformity with the local range astride the other main surfaces of the first metal member M1 and the second metal member M2. In addition, both the molding spaces 41 and 42 communicate with each other via the gap S.

Then, as illustrated in FIG. 10, in the manufacturing method for the composite structural body, a molten resin Rm being the material of the resin member R is pressurized to fill the molding space 4 (41 and 42) through the injection port 5 on the side where the one main surfaces of the first metal member M1 and the second metal member M2 are arranged (side where the fixed mold 2 is arranged). At this time, the molten resin Rm flows through the gap S between the first metal member M1 and the second metal member M2 into the molding space 42 on the side where the other main surfaces of the first metal member M1 and the second metal member M2 are arranged (side where the movable mold 3 is arranged).

In such a way, by the manufacturing method for the composite structural body, the molten resin Rm is cured to form the resin member R including the first resin layer R1, the second resin layer R2, and the link portion R3 formed in the gap S. As illustrated in FIG. 11, the composite structural body A in which the first metal member M1, the second metal member M2, and the resin member R are integrated with each other is manufactured.

By the manufacturing method for the composite structural body, the composite structural body A can be provided to have satisfactory moldability and sufficient strength and rigidity, and to be suitable as a component of the structure such as a vehicle body.

Note that, although the resin member R is molded by injecting the molten resin into the mold assembly in the above-described case of the manufacturing method for the composite structural body, the resin member R may be molded by pressing. In this case, for example, the mold assembly 1 to be used for implementing the manufacturing method includes the fixed mold 2 without the injection port 5 and the movable mold 3. The manufacturing method includes positioning the first metal member M1 and the second metal member M2 on the fixed mold 2, supplying a predetermined amount of the molten resin onto the fixed mold 2, and lowering the movable mold 3 such that the molten resin is pressurized between the movable mold 3 and the fixed mold 2 to fill an entirety of the molding space 4 in a manner of being flattened. In this way, the resin member R as in the illustration can be molded.

Third Embodiment

Figure 12:
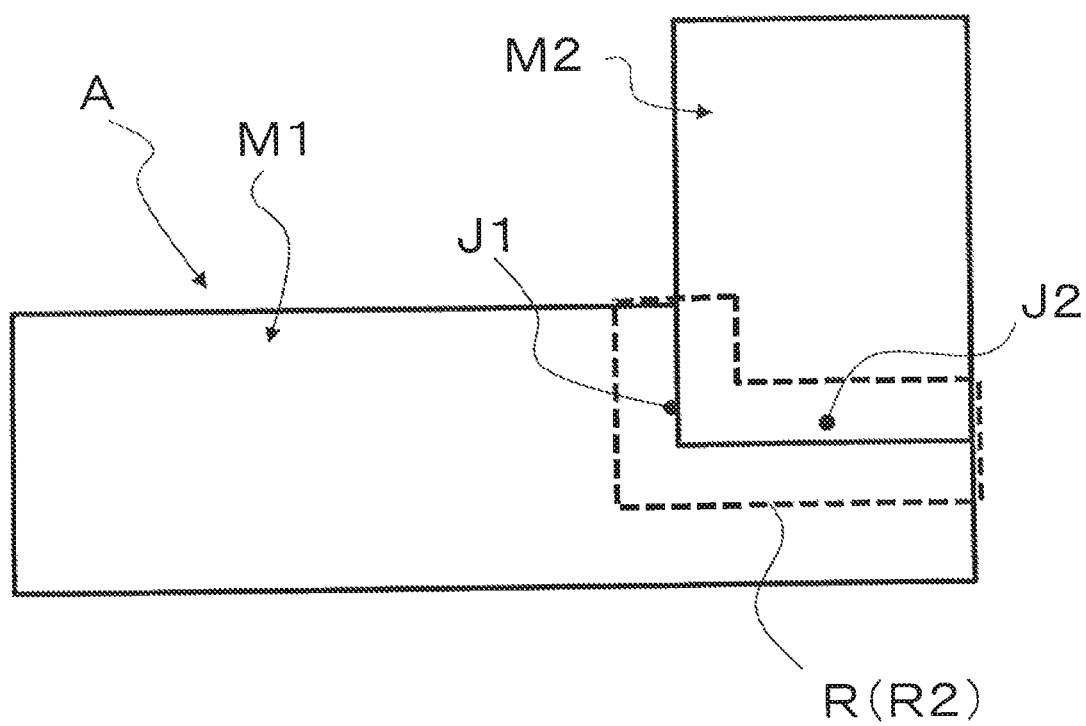
FIG. 12 is a front view of a main part of a composite structural body according to a third embodiment of the present invention.

In the composite structural body A illustrated in FIG. 12, as in the first embodiment, the joint portion J1 of the either one (first metal member M1) of the first metal member M1 and the second metal member M2 is formed in conformity with the shape of the end portion being the joint portion J2 of the other one of the metal members (second metal member M2). Note that, although the end portion of the second metal member M2 is coupled to the midpoint of the lateral portion Mb of the first metal member M1 in the configuration described in the first embodiment, in this embodiment, the end portion of the second metal member M2 is coupled to an end portion of the lateral portion Mb of the first metal member M1.

In this composite structural body A, not only advantages similar to those of the foregoing embodiments are provided, but also both the joint portions J1 and J2 are combined with each other in a three-dimensional shape. Thus, the coupling force is increased, and the force to be transmitted can be propagated. As a result, the strength and the rigidity are further increased.

Fourth Embodiment

Figure 13:
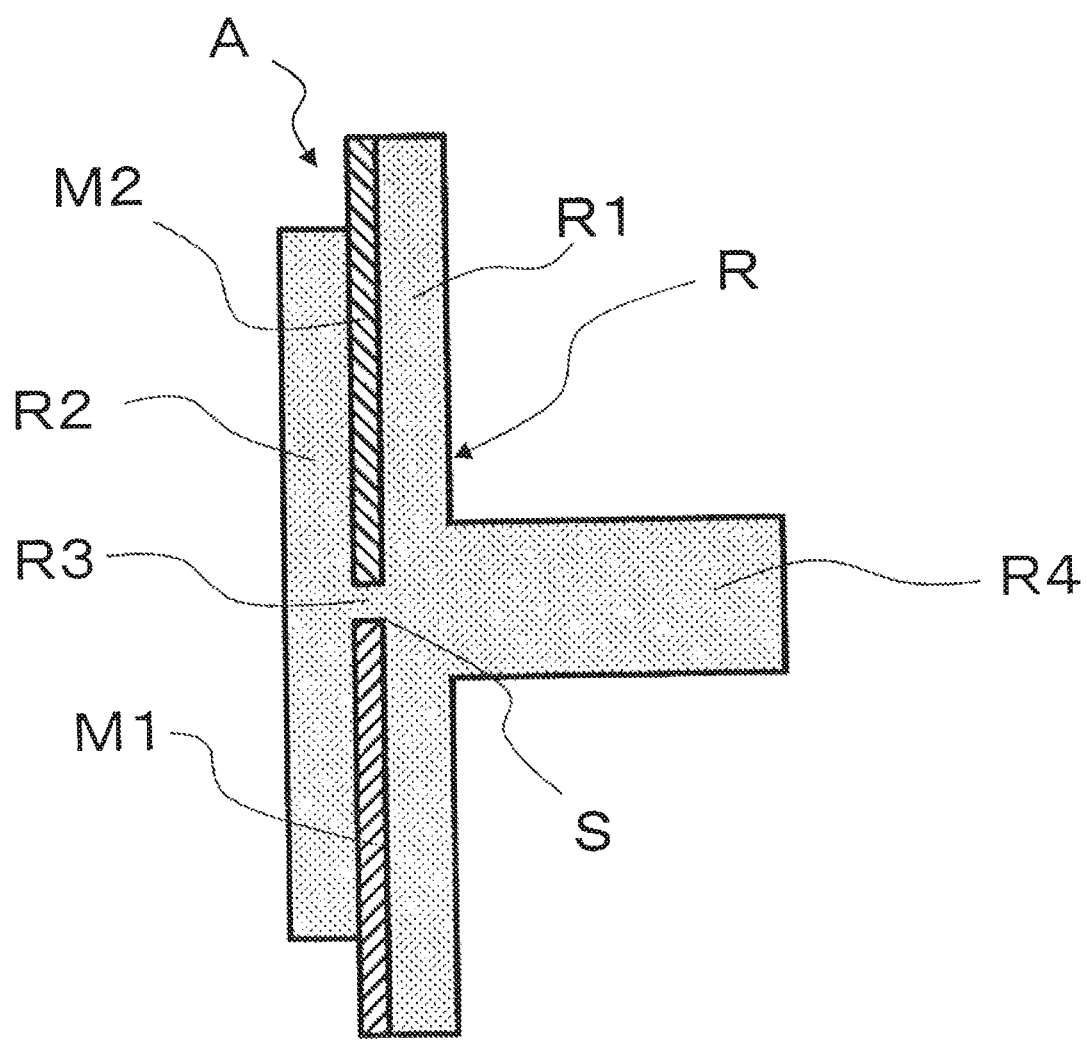
FIG. 13 is a cross-sectional view of a main part of a composite structural body according to a fourth embodiment of the present invention.

In the composite structural body A illustrated in FIG. 13, an at least one of the first resin layer R1 and the second resin layer R2 of the resin member R includes a reinforcing portion R4 that protrudes at a position of the boundary between the metal members M1 and M2. In the composite structural body A in the illustrated example, the reinforcing portion R4 is provided to the first resin layer R1 of the resin member R.

In the above-described composite structural bodies A, in their thickness directions, the boundary part between the first metal member M1 and the second metal member M2 is formed only of the resin. Thus, if the external force is applied, stress may concentrate on the resin member R. As a countermeasure, in this composite structural body A, the reinforcing portion R4 is provided at the boundary part between the metal members M1 and M2, that is, at a part where the metal members are absent in the thickness direction. With this, even when the external force is applied, the stress to be generated in the resin member R can be reduced, and hence the deformation of the composite structural body A can be suppressed.

Fifth Embodiment

Figure 14:
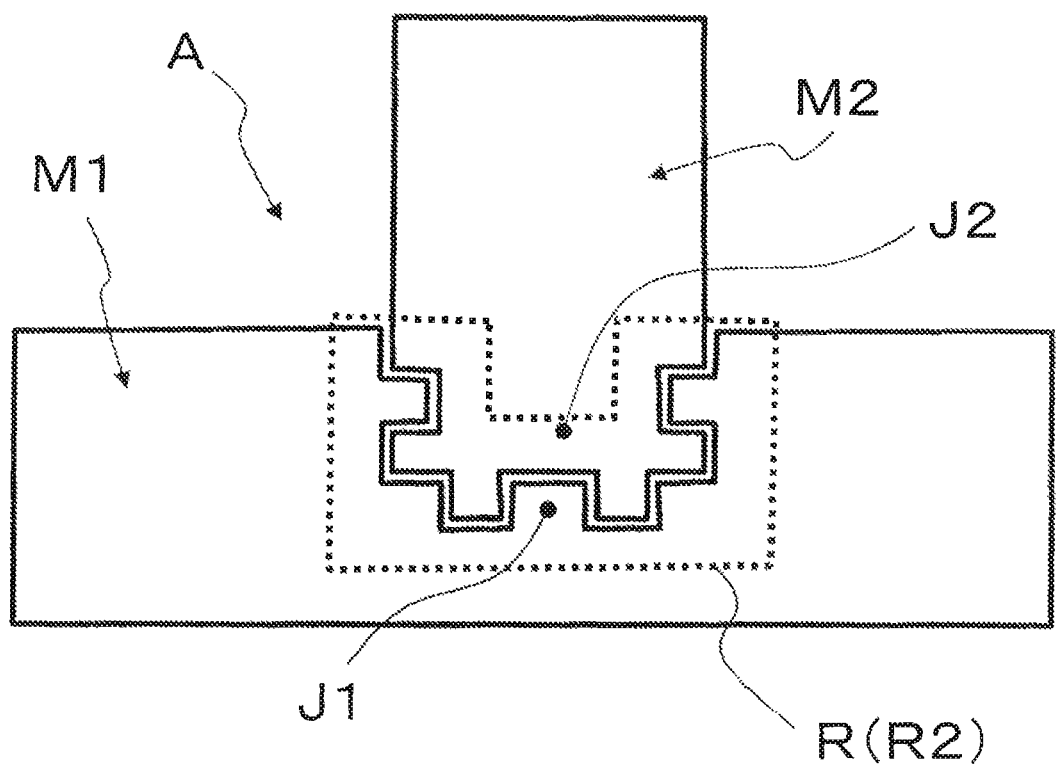
FIG. 14 is a front view of a main part of a composite structural body according to a fifth embodiment of the present invention.

In the composite structural body A illustrated in FIG. 14, the metal members M1 and M2 are respectively formed into recess-protrusion shapes to be engaged with each other at the boundary therebetween. The boundary between the metal members M1 and M2 in the illustrated example is a series of rectangular recesses and protrusions. Boundary protruding portions (or recessed portions) of the second metal member M2 are arranged in boundary recessed portions (or protruding portions) of the first metal member M1. Note that, as in the forgoing embodiment, in the composite structural body A, the gap (S) to form the link portion (R3) of the resin member R may be formed between the metal members M1 and M2.

In this composite structural body A, a coupling area is enlarged by forming the boundary between the metal members M1 and M2 into the recess-protrusion shapes. With this, even when the external force is applied, in the composite structural body A, stress per area at the coupling portions of the metal members M1 and M2 can be suppressed, and the force to be transmitted can be propagated at the coupling portions. As a result, the strength and the rigidity are further increased.

Sixth Embodiment

Figure 15:
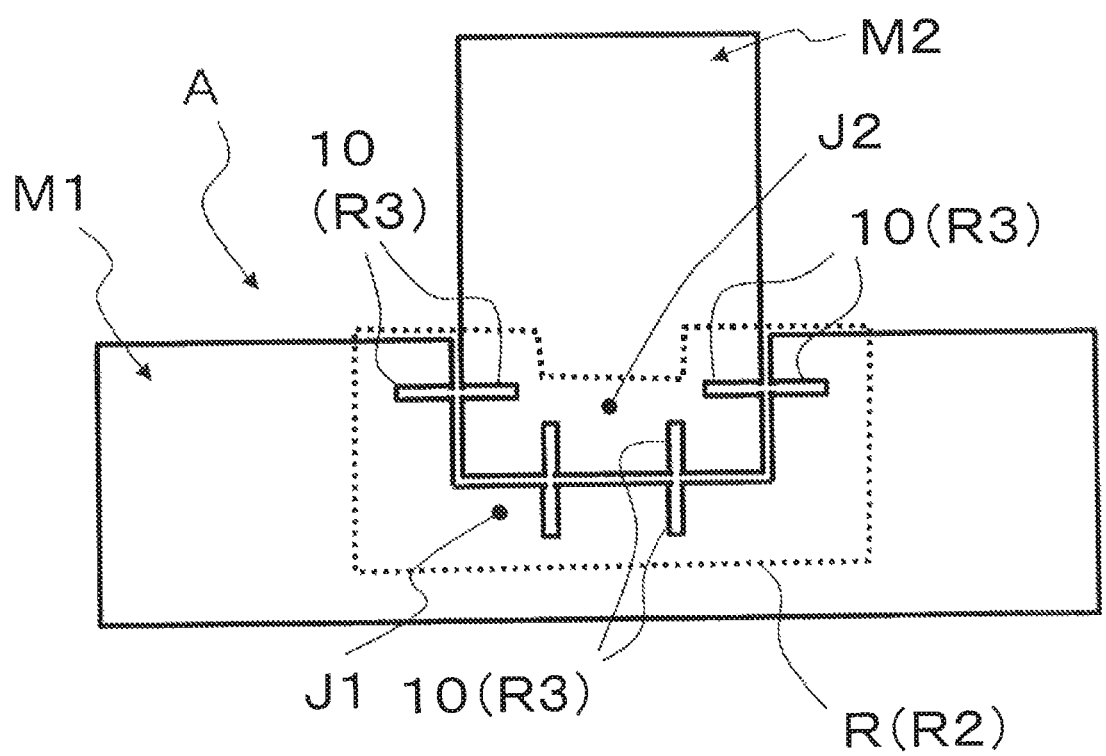
FIG. 15 is a front view of a main part of a composite structural body according to a sixth embodiment of the present invention.

In the composite structural body A illustrated in FIG. 15, an at least one of the first metal member M1 and the second metal member M2 includes opening portions 10 that communicate both a front surface and a rear surface with each other at the joint portions J1 and J2. The opening portions 10 of the composite structural body A of this embodiment are provided at a plurality of positions (four positions in the illustrated example) corresponding to each other through both the metal members M1 and M2. The opening portions 10 in the illustrated example are each a slit perpendicular to edge portions of the metal members M1 and M2 and has one end opened at the edge portions. In addition, in the composite structural body A, the link portion R3 that links the first resin layer R1 and the second resin layer R2 to each other is formed in the opening portions 10.

In this composite structural body A, in implementing the manufacturing method described with reference to FIG. 9 to FIG. 11, the opening portions 10 serve as passages for the molten resin. Thus, fluidity of the molten resin is further increased, and moldability of the resin member R is satisfactory. In addition, the link portion R3 of the composite structural body A is formed in the plurality of opening portions 10. Thus, not only the metal members M1 and M2 and the resin member R are coupled to each other, but also the plurality of link portions R3 serve as a mechanical coupling structure. As a result, the strength and the rigidity are further increased.

Figure 16:
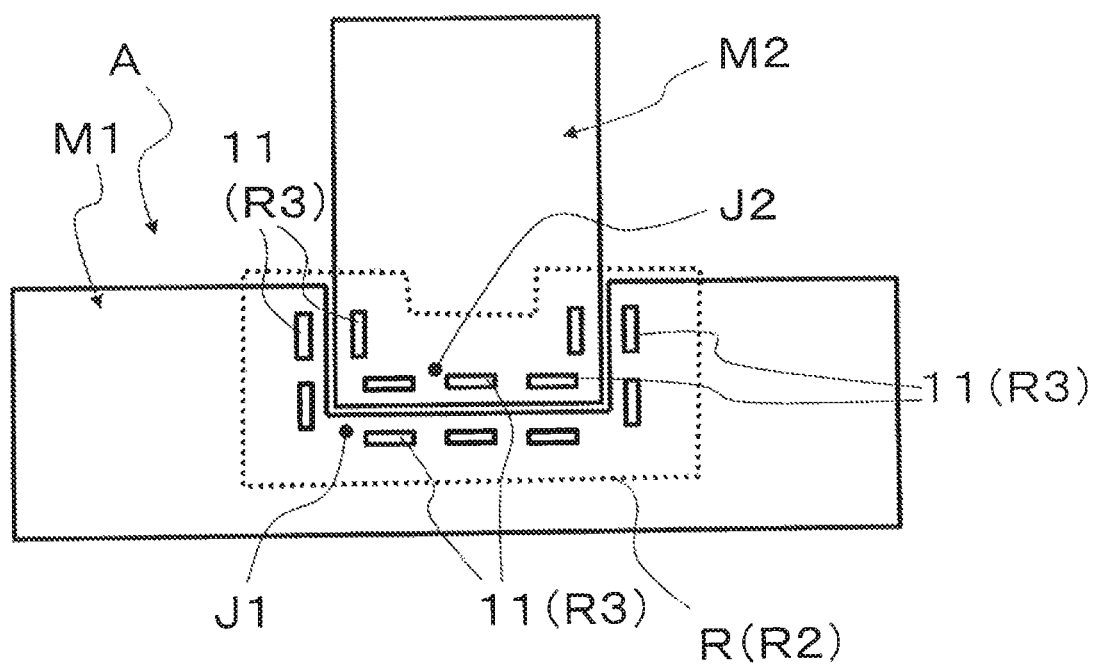
FIG. 16 is a front view of a main part of a composite structural body according to a seventh embodiment of the present invention.

In the composite structural body A illustrated in FIG. 16, an at least one of the first metal member M1 and the second metal member M2 includes opening portions 11 that communicate both the front surface and the rear surface with each other at the joint portions J1 and J2. The opening portions 11 of the composite structural body A of this embodiment are provided through both the metal members M1 and M2. The opening portions 11 in the illustrated example are each a slit parallel to the edge portions of the metal members M1 and M2 and are arranged at a predetermined interval like broken lines along the edge portions. In addition, in the composite structural body A, the link portion R3 that links the first resin layer R1 and the second resin layer R2 to each other is formed in the opening portions 11.

In this composite structural body A, as in the sixth embodiment, at the time of manufacture, the opening portions 11 serve as the passages for the molten resin, and hence the moldability of the resin member R is more satisfactory. In addition, the link portions R3 are formed in the plurality of opening portions 11 to serve as the mechanical coupling structure. As a result, the strength and the rigidity are further increased.

Eighth Embodiment

Figure 17:
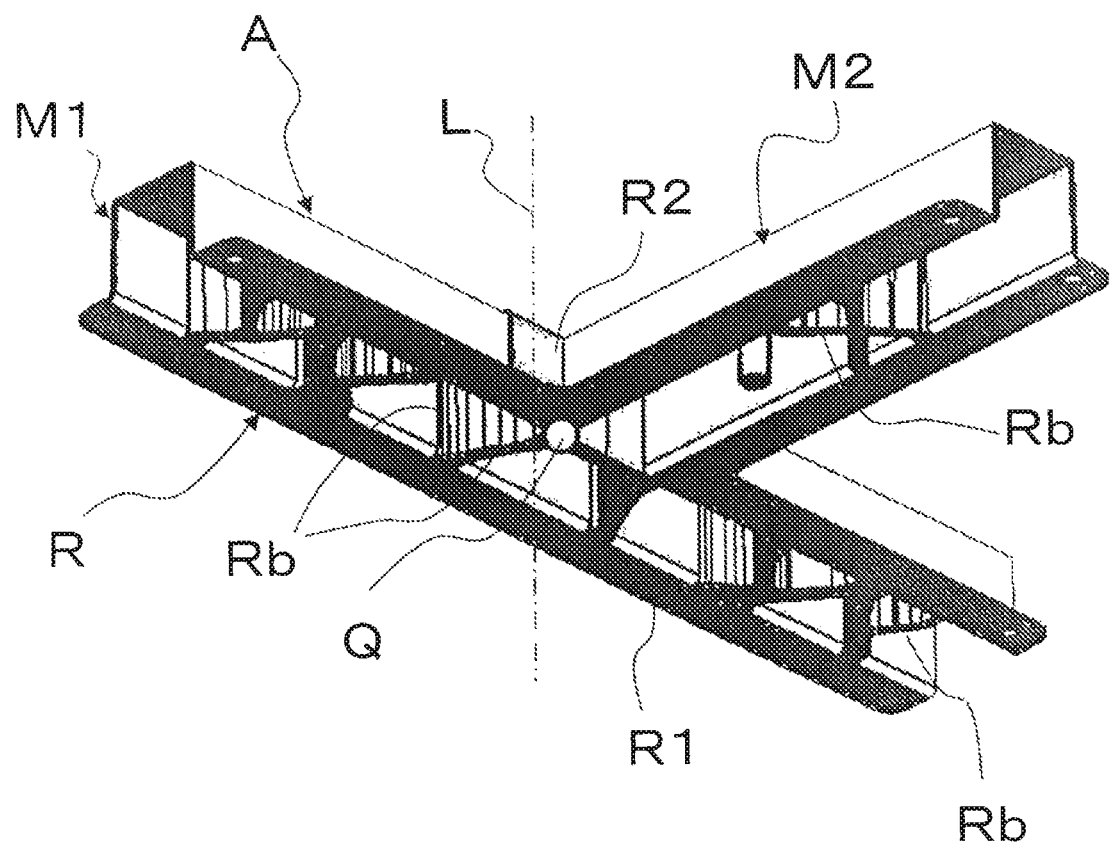
FIG. 17 is a perspective view of a composite structural body according to an eighth embodiment of the present invention.

In the composite structural body A illustrated in FIG. 17, a boundary L between the first metal member M1 and the second metal member M2 is arranged out of a stress concentration point Q in the composite structural body A. Since the composite structural body A is formed into the T-shape, the stress due to the external force concentrates on the coupling parts of both the metal members M1 and M2, specifically, on an end portion (Q) of the rib Rb. In other words, it is desired that positions and shapes of the joint portions J1 and J2 of the metal members M1 and M2 of the composite structural body A be set such that the boundary L between the metal members M1 and M2 is out of the stress concentration point Q.

As a specific example, the composite structural body A of this embodiment constitutes a lower portion of a center pillar and an intermediate portion of a side sill of the automotive side panel. In other words, in the composite structural body A illustrated in FIG. 17, the first metal member M1 constitutes a part of the side sill, and the second metal member M2 constitutes a part of the center pillar. Note that, as described above, the strength of the automotive side panel is set in consideration of the side collision. In case of the side collision, the stress concentrates on an intersection portion between the center pillar and the side sill, that is, an intersection portion between the first metal member M1 and the second metal member M2 of the composite structural body A.

In the composite structural body A, in consideration of the stress concentration as described above, the boundary L between the first metal member M1 and the second metal member M2 is arranged out of the intersection portion being the stress concentration point Q. With this, in the composite structural body A, the stress itself to be applied to the coupling portions of the metal members M1 and M2 is suppressed, and the strength and the rigidity of the coupling portions can be secured even without providing another reinforcing means.

Ninth Embodiment

Figure 18:
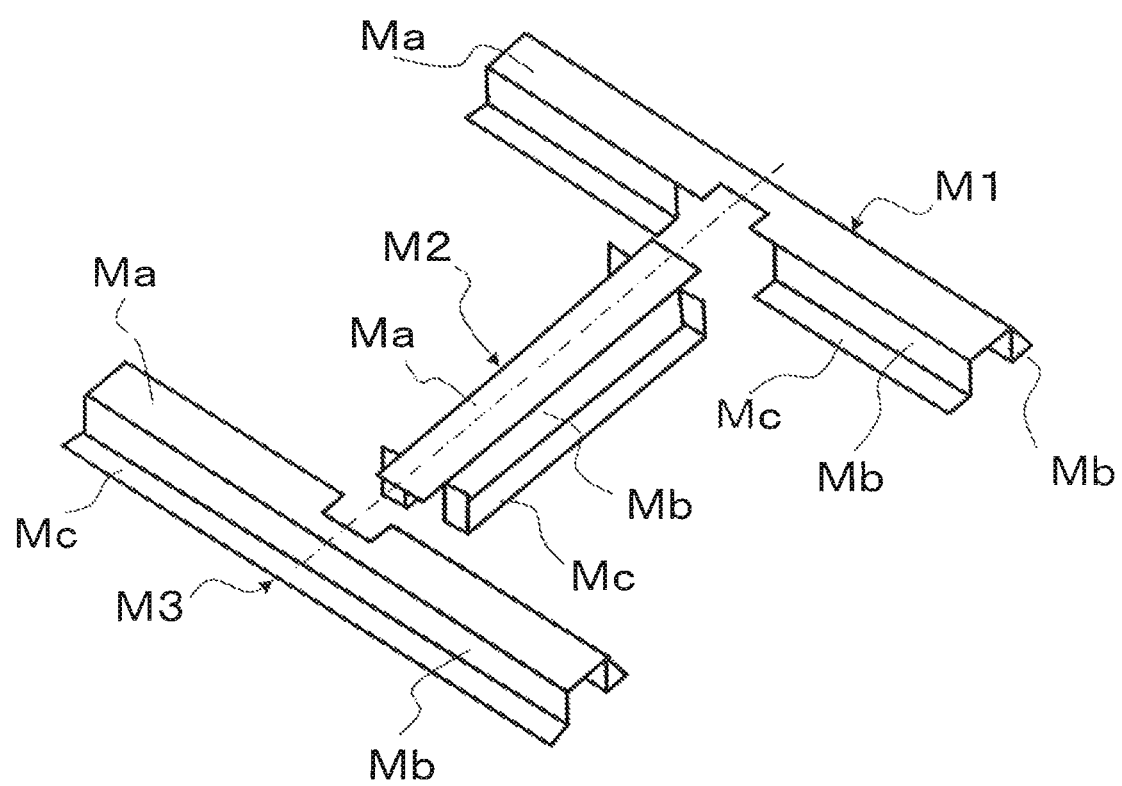
FIG. 18 is a perspective view illustrating a state in which metal members have not yet been coupled to each other in a composite structural body according to a ninth embodiment of the present invention.
Figure 19:
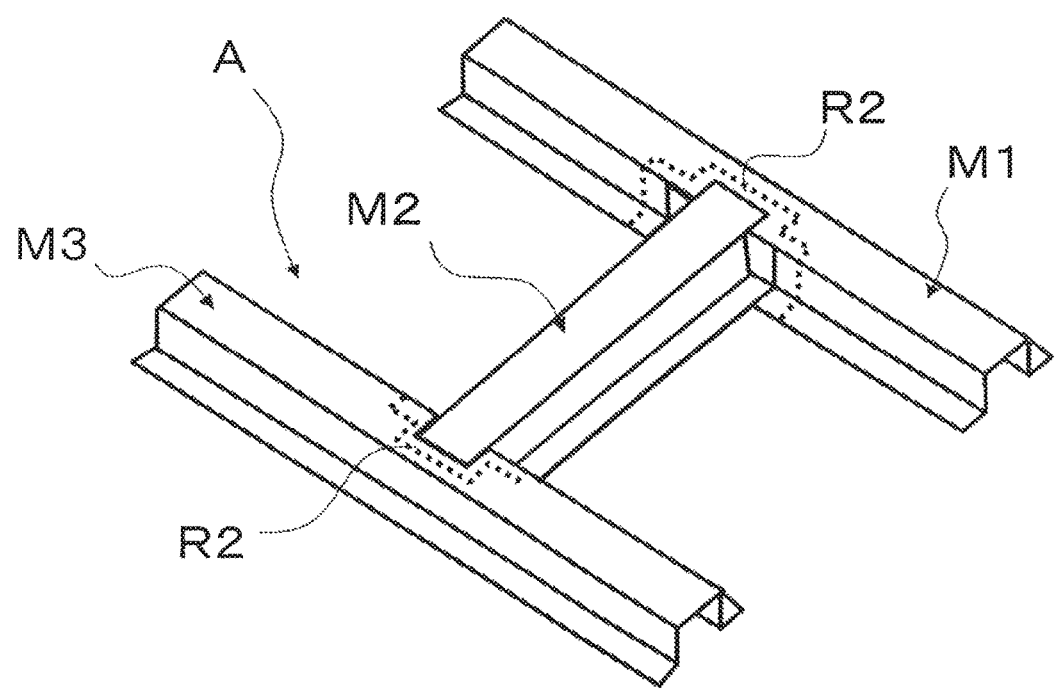
FIG. 19 is a perspective view illustrating a state in which the metal members illustrated in FIG. 18 are coupled to each other.

In the composite structural body A illustrated in FIG. 18 and FIG. 19, at least one of the first metal member M1 and the second metal member M2 includes a third metal member M3 to be integrated by the resin member R. In the composite structural body A of this embodiment, the one end portion of the second metal member M2 is coupled to the midpoint of the first metal member M1, and a midpoint of the third metal member M3 is coupled to another end portion of the second metal member M2.

The resin member R includes the first resin layer (not shown) that coats astride the respective one main surfaces of the first metal member M1 and the second metal member M2 and one main surface of the third metal member M3, the second resin layer R2 that is formed in the local range astride the other main surfaces of the first metal member M1 and the second metal member M2, and another second resin layer R2 that coats a local range astride the other main surface of the second metal member M2 and another main surface of the third metal member M3.

As described above, even when made, for example, of high-strength materials, all the metal members M1 to M3 of the composite structural body A can be easily molded by the plastic working such as bending or deep drawing of the plates of such metal materials. In addition, by the above-described manufacturing method, all the metal materials M1 to M3 and the resin member R of the composite structural body A can be integrated with each other.

Thus, the composite structural body A is capable of forming a predetermined structure by combining with the third metal member M3 or more metal members. In other words, the predetermined structure can be divided into a plurality of divided bodies, and each of the divided bodies can be formed with the composite structural body A.

This enables the composite structural body A to form a structure including the metal members and the resin member even without use of large-scale equipment or other components, for example, unlike the case where the single-piece metal member is used. As a result, the number of man-hours and manufacturing cost can be significantly reduced. In addition, moldability of all the metal members M1 to M3 of the composite structural body A is more satisfactory than that in the case where the single-piece metal member is used, and hence the range of options of the materials is expanded, and hence even the high-strength materials can be used. As a result, weight reduction also can be achieved.

Tenth Embodiment

Figure 20:
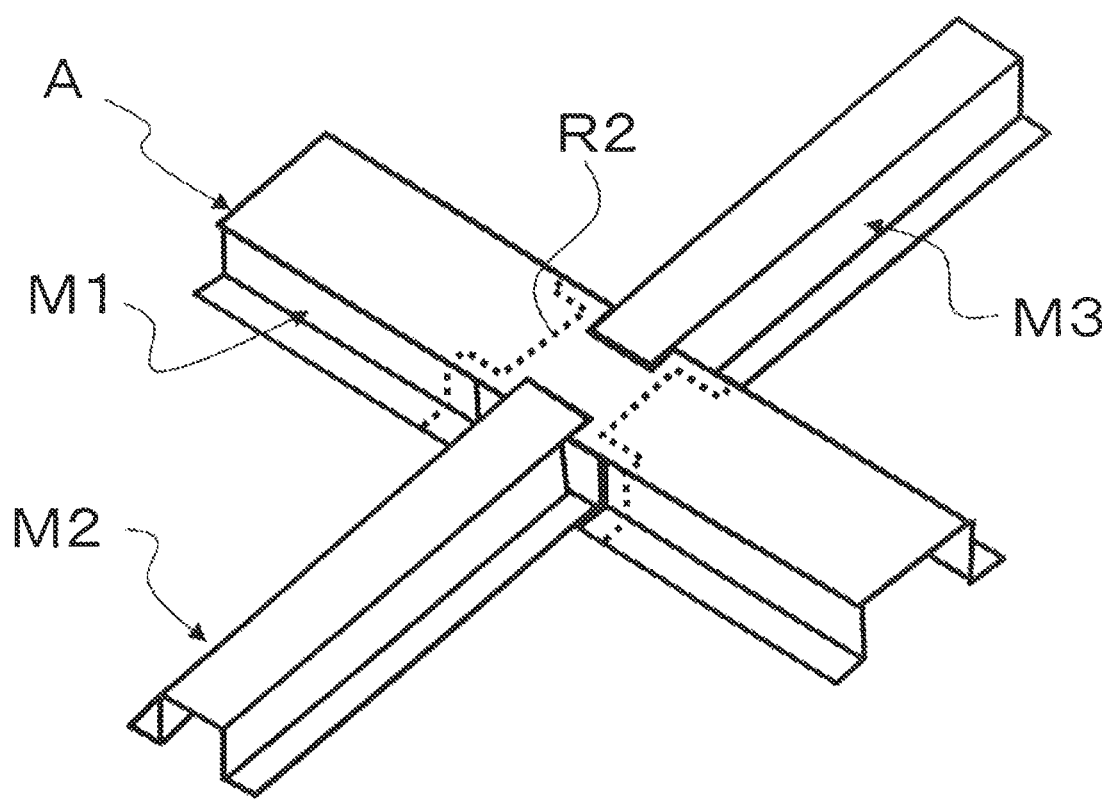
FIG. 20 is a perspective view of a composite structural body according to a tenth embodiment of the present invention.

In the composite structural body A illustrated in FIG. 20, at least one of the first metal member M1 and the second metal member M2 includes the third metal member M3 to be integrated by the resin member R. In the composite structural body A in the illustrated example, the one end portion of the second metal member M2 is coupled to a midpoint of one lateral portion of the first metal member M1, and an end portion of the third metal member M3 is coupled to a midpoint of another lateral portion of the first metal member M1.

The resin member R includes the first resin layer (not shown) that coats astride the respective one main surfaces of the first metal member M1, the second metal member M2, and the third metal member M3, and the second resin layer R2 that is formed in the local range astride the other main surfaces of the first metal member M1, the second metal member M2, and the third metal member M3. In such a way, the second resin layer R2 of the composite structural body A is formed astride the three metal members M1, M2, and M3.

As in the ninth embodiment, the composite structural body A is capable of forming the structure including the metal members and the resin member even without use of large-scale equipment or other components unlike the case where the single-piece metal member is used. As a result, the number of man-hours and the manufacturing cost can be significantly reduced. In addition, the range of options of the materials of the composite structural body A is expanded, and hence even the high-strength materials can be used. As a result, weight reduction also can be achieved.

Eleventh Embodiment

Figure 21:
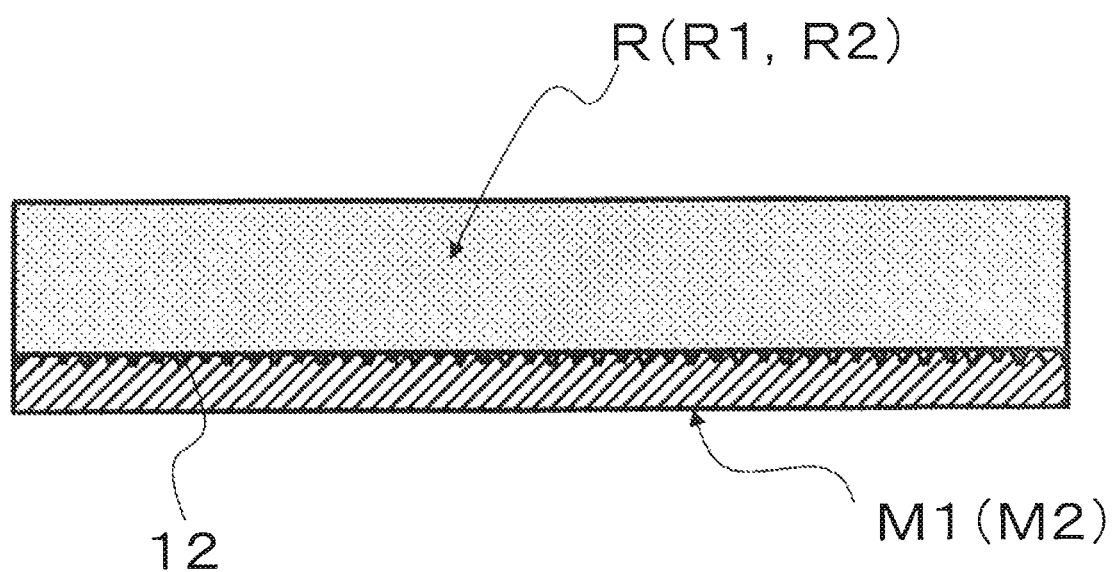
FIG. 21 is a cross-sectional view of a composite structural body according to an eleventh embodiment of the present invention.

As partially illustrated in FIG. 21, the composite structural body A includes a fine asperity 12 formed on the main surfaces of the metal members M1 (M2), which are coated with the resin member R. The fine asperity 12 can be formed, for example, by blasting, laser machining, or chemical conversion treatment.

The fine asperity 12 of this composite structural body A enlarges the area in which the metal members M1 (M2) and the resin member R are held in contact with each other, and both the members are mechanically coupled to each other. Thus, the coupling force can be increased.

Twelfth Embodiment

Figure 22:
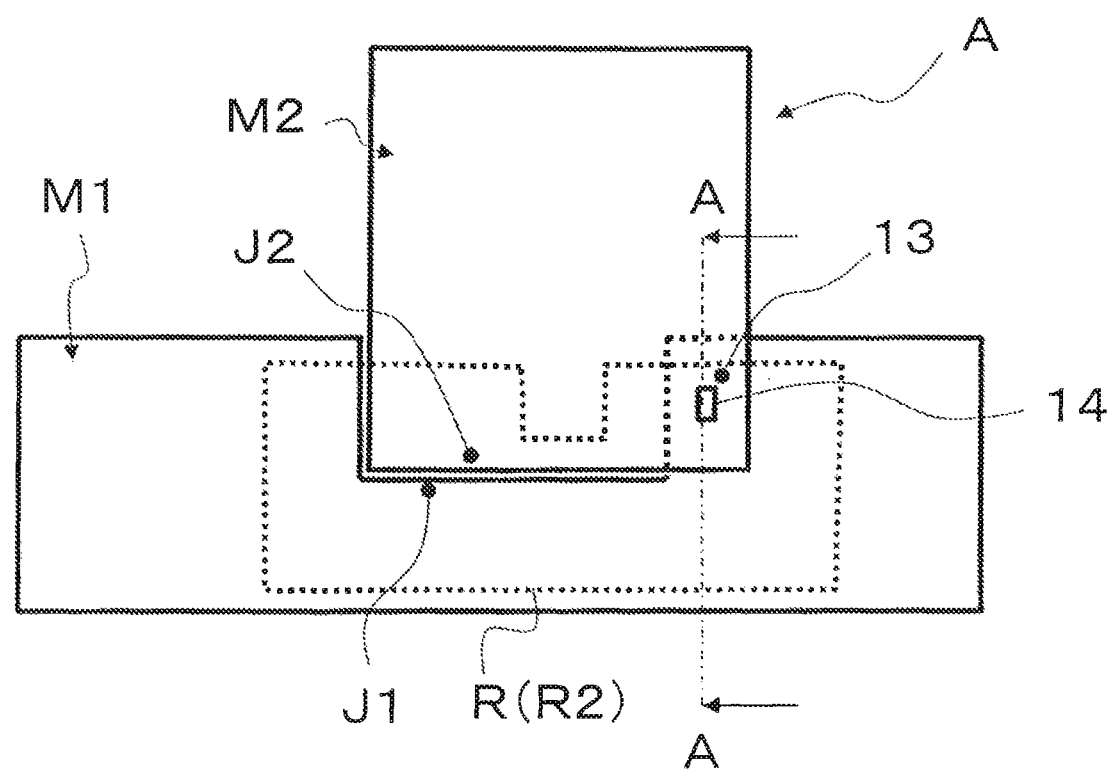
FIG. 22 is a front view of a main part of a composite structural body according to a twelfth embodiment of the present invention.
Figure 23:
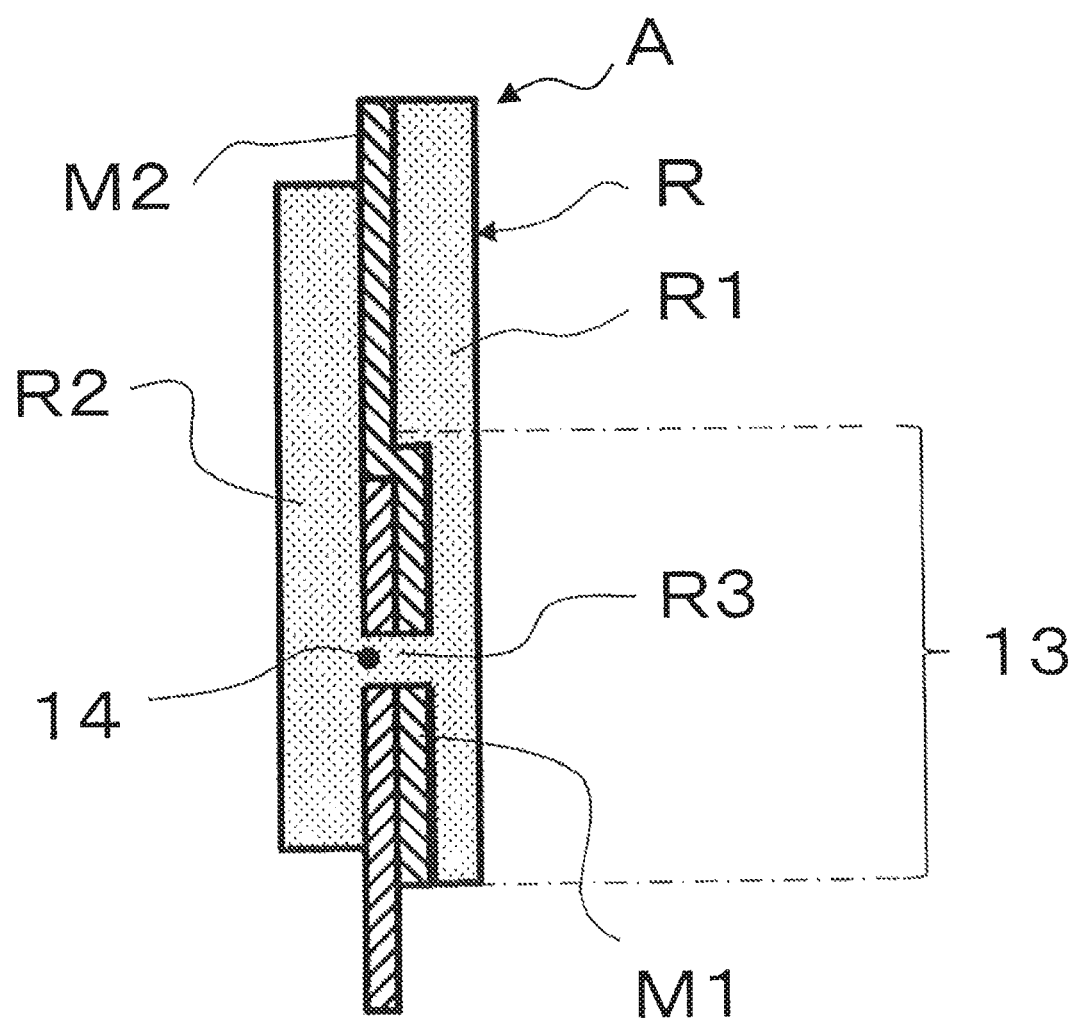
FIG. 23 is a cross-sectional view taken along the arrows A-A in FIG. 22.

In the composite structural body A illustrated in FIG. 22 and FIG. 23, the first metal member M1 and the second metal member M2 include an overlapping region 13 in which at least a part of the first metal member M1 and at least a part of the second metal member M2 overlap with each other, and a communication hole 14 that is formed through the overlapping region 13. In the composite structural body A in the illustrated example, the overlapping region 13 and the communication hole 14 are provided in the respective joint portions J1 and J2. In addition, in the composite structural body A, the link portion R3 that links the first resin layer R1 and the second resin layer R2 to each other is formed in the communication hole 14.

In the composite structural body A, by the overlapping region 13 and the link portion R3 formed in the communication hole 14, the force of coupling the metal members M1 and M2 and the resin member R to each other is further increased. As a result, the strength and the rigidity can be further increased.

Thirteenth Embodiment

FIG. 24 to FIG. 27 are views illustrating steps of manufacturing an automotive floor panel as an application example of the composite structural body. In other words, the composite structural body of this embodiment is used as a component of a floor panel FP being a structure.

Figure 24:
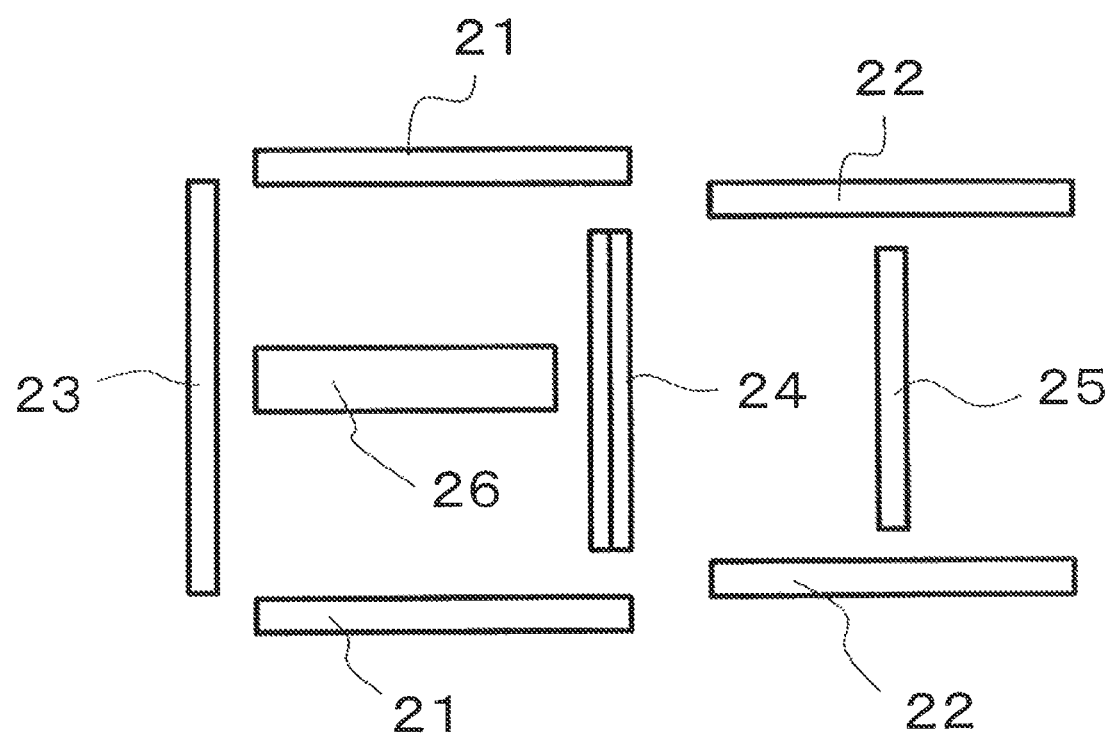
FIG. 24 is a plan view of a composite structural body according to a thirteenth embodiment of the present invention, which illustrates a state in which an automotive floor panel is divided into a plurality of metal members.

FIG. 24 is a view illustrating a state in which the floor panel FP is disassembled into a plurality of metal members. The floor panel FP is divided into right-and-left front side members 21 and 21, right-and-left rear side members 22 and 22, a front cross member 23, a center cross member 24, a rear cross member 25, and a center member (what is called tunnel) 26 as the metal members.

In this way, the members 21 to 26 can be divided into the metal members each having a relatively simple shape. Thus, these metal plates can be easily molded into predetermined three-dimensional shapes by the plastic working such as bending or deep drawing. Note that, in this embodiment, the illustrated main components of the floor panel FP are merely examples. Thus, the floor panel FP may actually include a larger number of components.

Figure 25:
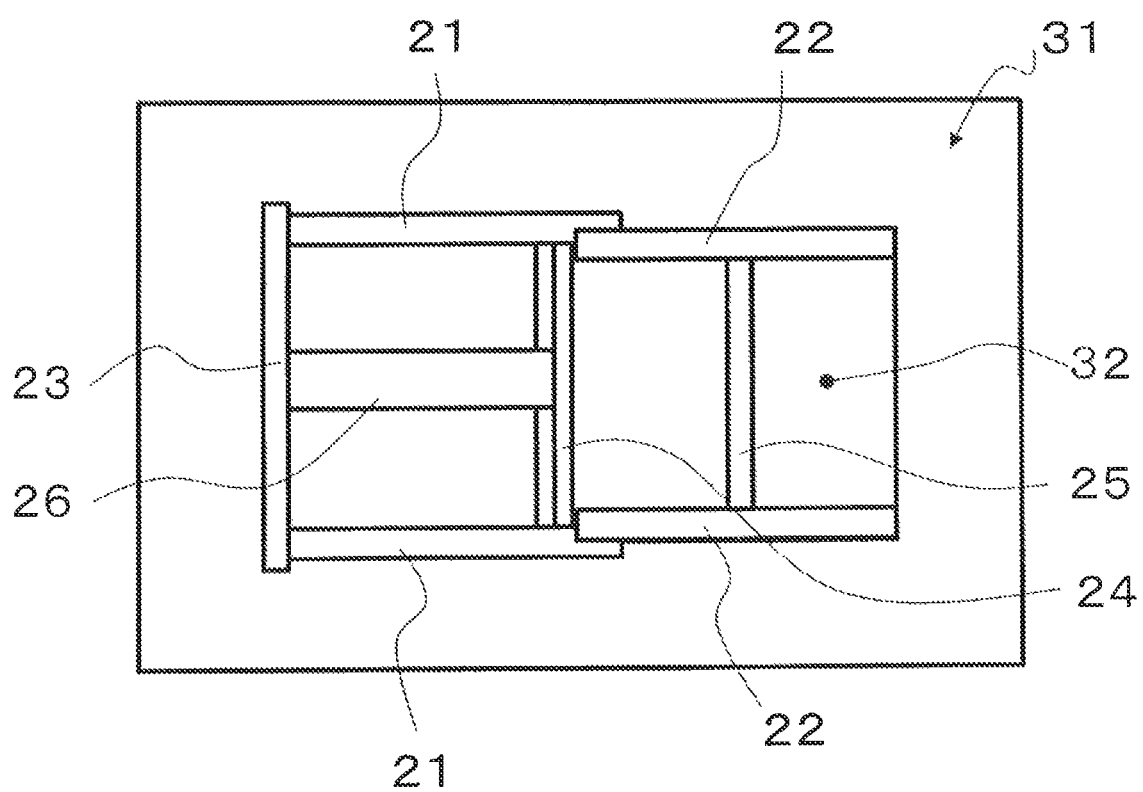
FIG. 25 is a plan view illustrating a state in which the metal members illustrated in FIG. 24 are set in a mold assembly.

As illustrated in FIG. 25, the metal members (members 21 to 26) are positioned in a molding space 31 in a mold assembly 30. At this time, as configurations of respective joint portions of the metal members, the configurations described in the first embodiment to the twelfth embodiment may be employed. Note that, the molding space 31 corresponds to sizes and shapes of the metal members and the resin member to be subsequently molded.

Figure 26:
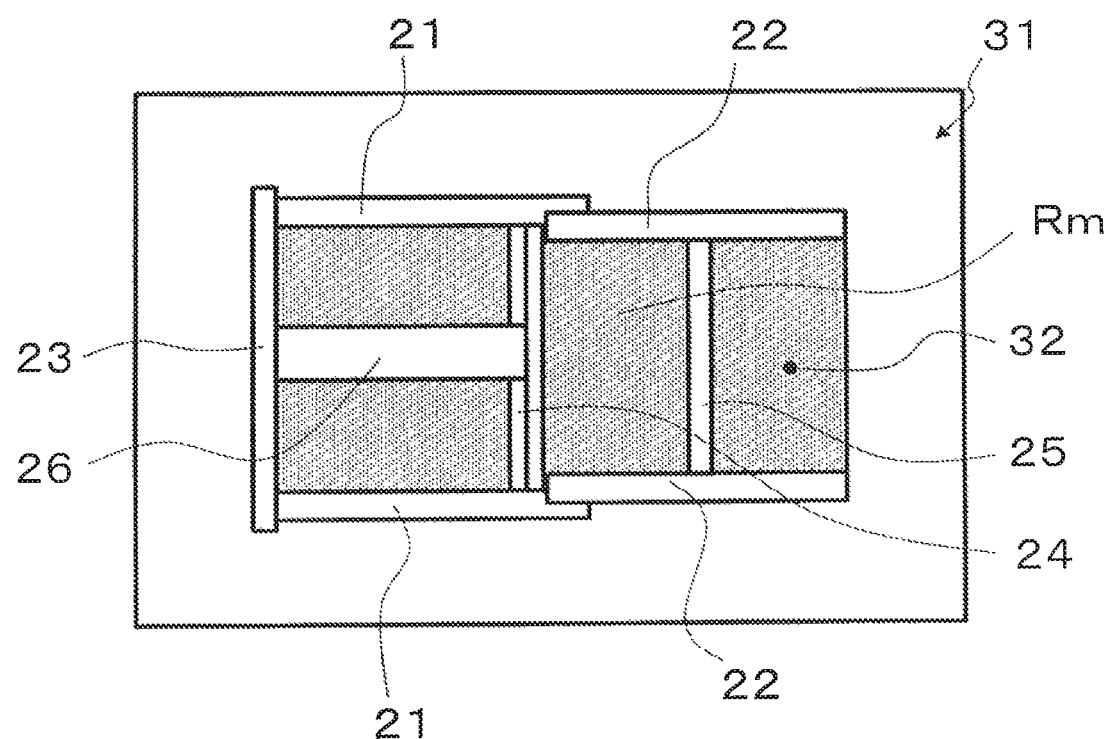
FIG. 26 is a plan view subsequent to FIG. 25, which illustrates a state in which the molten resin is supplied in the mold assembly.
Figure 27:
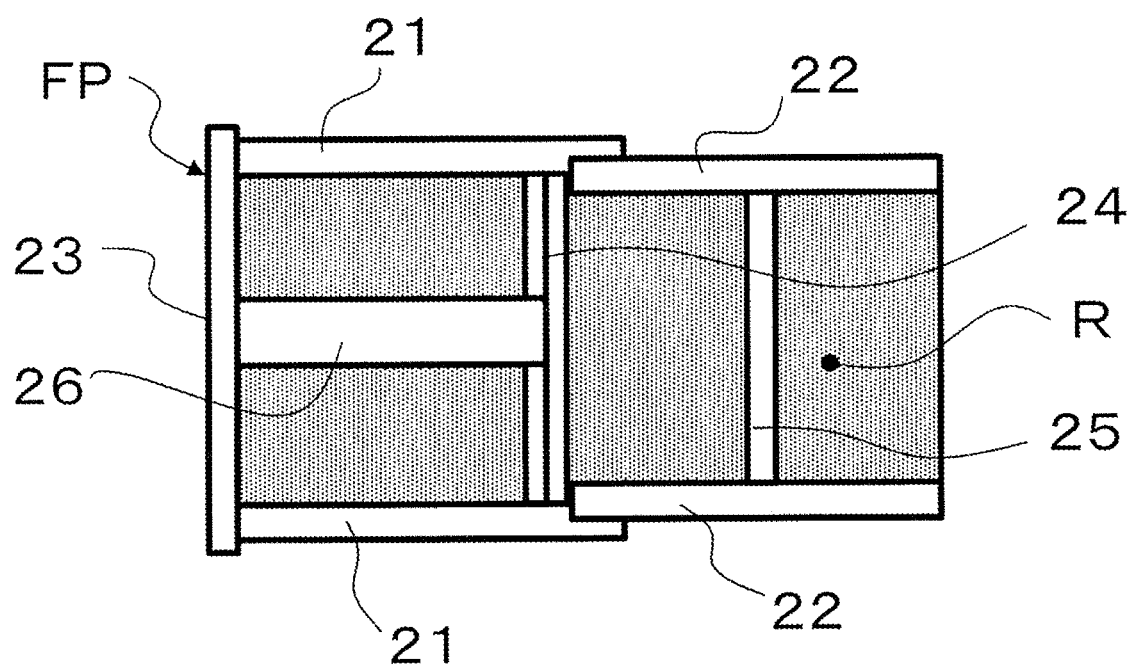
FIG. 27 is a plan view subsequent to FIG. 26, which illustrates the floor panel after manufacture.

Next, as illustrated in FIG. 26, the molten resin Rm is injected into the molding space 31 in the mold assembly 30. Note that, the molten resin Rm may be charged by a closing operation (pressing) of the mold assembly 30. In this way, as illustrated in FIG. 27, the floor panel FP in which the metal members (members 21 to 26) and the resin member R are integrated with each other can be provided.

Fourteenth Embodiment

Figure 28:
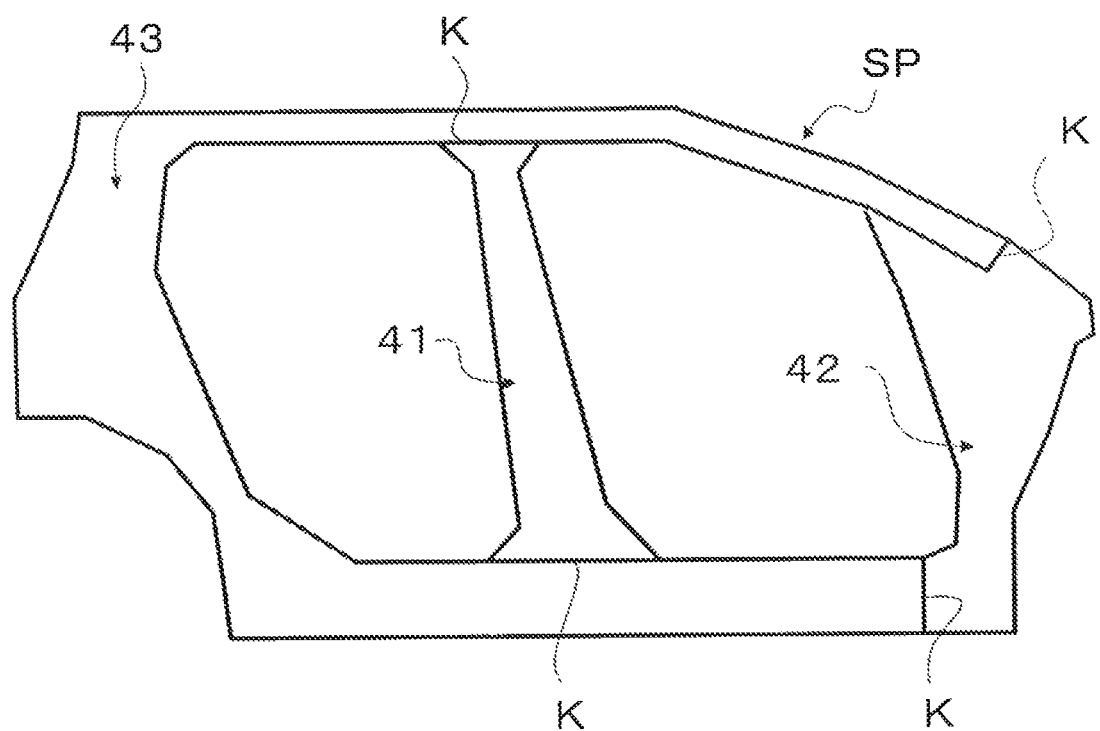
FIG. 28 is a front view of composite structural bodies according to a fourteenth embodiment of the present invention, which constitute an automobile side panel.

FIG. 28 is a view of an automotive side panel SP as another application example of the composite structural body. This side panel SP is divided into a center pillar portion 41, a front pillar portion 42, and a rear pillar portion 43 including a sill and a roof side, each of which may be the composite structural body. In this case, on the side panel SP, cutting lines K are drawn between these portions (between the composite structural bodies). However, if these cutting lines K are arranged at inconspicuous parts such as insides of a door and a fender, there is no risk that an external appearance is impaired.

Figure 29:
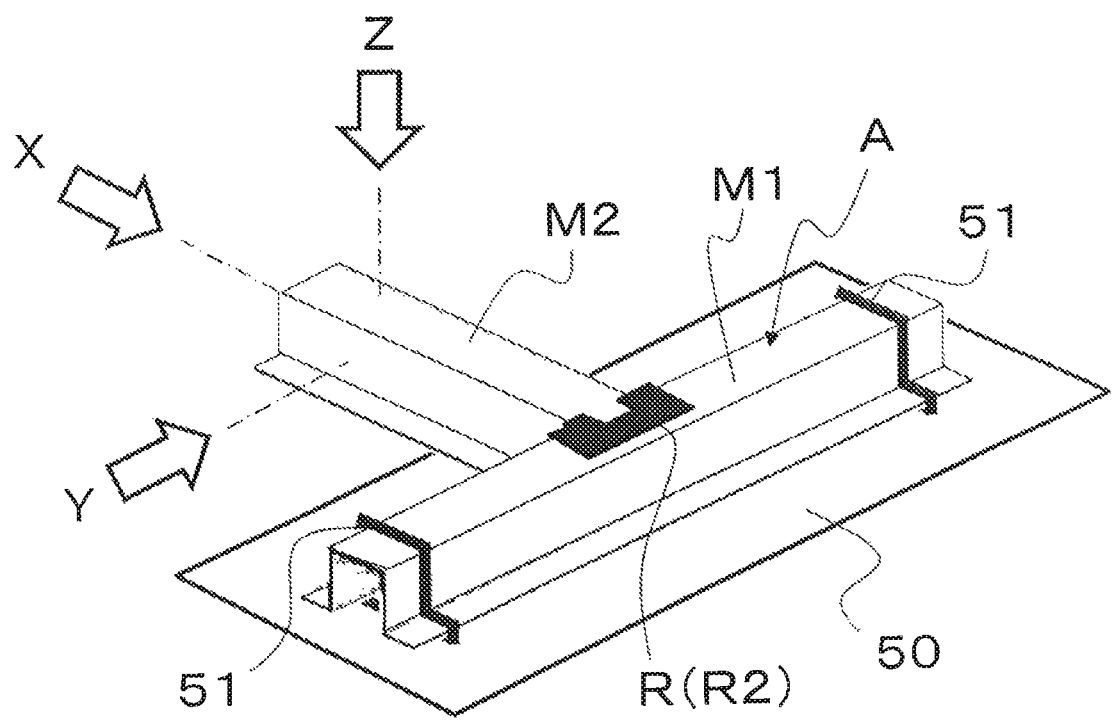
FIG. 29 is an explanatory perspective view illustrating how a strength test was conducted on the composite structural body.

FIG. 29 is an explanatory perspective view illustrating how a strength test was conducted on the composite structural body. As described in the first embodiment, the composite structural body A is provided by integrating the first metal member M1 and the second metal member M2 arranged in the T-shape with the resin member R. In the test, both ends of the first metal member M1 of the composite structural body A were fixed on a support 50 with retainers 51 and 51. Respective loads in a direction of an axis line of the second metal member M2 (direction of an arrow X), in a horizontal direction orthogonal to the axis line of the second metal member M2 (direction of an arrow Y), and in a perpendicular direction (direction of an arrow Z) were applied to the end portion of the second metal member M2, and displacement was measured.

In addition, as a conventional example, a similar test was conducted on a T-shaped composite structural body formed by charging the resin member into a metal member molded by integrating the first metal member and the second metal member with each other. As a result, it was confirmed that the composite structural body A of the present invention was capable of securing strength and rigidity equivalent to or higher than those in the conventional example against the loads in all the directions. In such a way, the composite structural body A not only has satisfactory moldability, but also has the strength and the rigidity that are not inferior at all to those in the conventional example. Thus, the composite structural body A has a significantly high utility value as a component of structures of, for example, an automobile.

Configurations of the composite structural body according to the present invention are not limited to those of the foregoing embodiments, and may be changed as appropriate within the gist of the present invention. Alternatively, the configurations of the embodiments may be combined with each other.

REFERENCE SIGNS LIST

J1 Joint portion
J2 Joint portion
L Boundary
M1 First metal member
M2 Second metal member
M3 Third metal member
Q Stress concentration point
R Resin member
R1 First resin layer
R2 Second resin layer
R3 Link portion
R4 Reinforcing portion
1 Mold assembly
4 Molding space
10, 11 Opening portion
12 Fine asperity
13 Overlapping region
14 Communication hole

The invention claimed is:

1. A composite structural body, comprising:
a first metal member having a plate-like shape;
a second metal member having a plate-like shape; and
a resin member that integrates the first metal member and the second metal member with each other, wherein:
the resin member includes:
a first resin layer that coats astride one main surface of the first metal member and one main surface of the second metal member,
a second resin layer that coats astride another main surface of the first metal member and another main surface of the second metal member, and
a link portion that links the first resin layer and the second resin layer to each other;
one of the first metal member or the second metal member includes a recessed joint portion formed in conformity with a shape of an end portion of another metal member; and
the end portion of the other of the first metal member or the second metal member is inserted in the joint portion of the one of the first metal member or the second metal member in an engaging manner.

2. The composite structural body according to claim 1, wherein the first metal member and the second metal member are arranged such that their main surfaces are continuous with each other.

3. The composite structural body according to claim 1, wherein at least one of the first resin layer and the second resin layer of the resin member includes a reinforcing portion that protrudes at a position of a boundary between the first metal member and the second metal member.

4. The composite structural body according to claim 1, wherein the first metal member and the second metal member are respectively formed into recess-protrusion shapes to be engaged with each other at the boundary between the first metal member and the second metal member.

5. The composite structural body according to claim 1, wherein:
at least one of the first metal member and the second metal member includes an opening portion that communicates both a front surface and a rear surface with each other at the joint portion, and
the link portion that links the first resin layer and the second resin layer to each other is formed in the opening portion.

6. The composite structural body according to claim 3, wherein the boundary between the first metal member and the second metal member is arranged out of a stress concentration point in the composite structural body.

7. The composite structural body according to claim 1, wherein a fine asperity is formed on the main surface of the first metal member and the main surface of the second metal member, the main surface of the first metal member and the main surface of the second metal member being coated with the resin member.

8. The composite structural body according to claim 1, wherein:
the first metal member and the second metal member include an overlapping region in which at least a part of the first metal member and at least a part of the second metal member overlap with each other;
a communication hole that is formed through the overlapping region; and
the link portion that links the first resin layer and the second resin layer to each other is formed in the communication hole.

9. The composite structural body according to claim 1, wherein:
the first resin layer is formed on the one main surface of the first metal member and the one main surface the second metal member;
the second resin layer is formed in a local range of the other main surface of the first metal member and the other main surface of the second metal member; and
a range in which the first resin layer is formed is wider than the local range in which the second resin layer is formed.

10. The composite structural body according to claim 1, wherein at least one of the first metal member and the second metal member includes a third metal member to be integrated by the resin member.

11. A manufacturing method for the composite structural body according to claim 1, the manufacturing method being implemented by using a mold assembly including a molding space conforming to the first metal member, the second metal member, and the resin member, the manufacturing method comprising:
setting the first metal member and the second metal member in the molding space;
forming a gap between the first metal member and the second metal member;
charging a molten resin being a material of the resin member into the molding space from a side where the one main surface of the first metal member and the one main surface of the second metal member are arranged; and
causing the molten resin to flow through the gap between the first metal member and the second metal member into a side where the other main surface of the first metal member and the other main surface of the second metal member are arranged, thereby forming the resin member including:
the first resin layer,
the second resin layer, and
the link portion formed in the gap; and
integrating the first metal member, the second metal member, and the resin member with each other.

12. A composite structural body, comprising:
a first metal member having a plate-like shape;
a second metal member having a plate-like shape; and
a resin member that integrates the first metal member and the second metal member with each other, wherein:
the resin member includes:
a first resin layer that coats astride one main surface of the first metal member and one main surface of the second metal member, and
a second resin layer that coats astride another main surface of the first metal member and another main surface of the second metal member;
the first metal member and the second metal member do not include a part in which the first metal member and the second metal member overlap with each other; and
a fine asperity is formed on the main surface of the first metal member and the main surface of the second metal member, the main surface of the first metal member and the main surface of the second metal member being coated with the resin member.

13. The composite structural body according to claim 12, wherein the resin member includes a local range which is formed astride the first metal member and the second metal member.

* * * * *